(12) United States Patent
Ito

(10) Patent No.: US 8,493,666 B2
(45) Date of Patent: Jul. 23, 2013

(54) ZOOM LENS AND IMAGE PICKUP APPARATUS WITH ZOOM LENS

(75) Inventor: Daisuke Ito, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 50 days.

(21) Appl. No.: 13/231,252

(22) Filed: Sep. 13, 2011

(65) Prior Publication Data

US 2012/0087016 A1    Apr. 12, 2012

(30) Foreign Application Priority Data

Oct. 7, 2010 (JP) ................. 2010-227663
Aug. 26, 2011 (JP) ................. 2011-184761

(51) Int. Cl.
*G02B 15/14* (2006.01)

(52) U.S. Cl.
USPC .......................................... 359/690

(58) Field of Classification Search
USPC .......................................... 359/690
See application file for complete search history.

(56) References Cited

U.S. PATENT DOCUMENTS

| 6,594,087 | B2 | 7/2003 | Uzawa et al. |
| 7,304,805 | B2 | 12/2007 | Endo et al. |
| 2011/0080653 | A1* | 4/2011 | Kimura ................. 359/683 |

* cited by examiner

*Primary Examiner* — William Choi
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, and a third lens unit having a positive refractive power. In the zoom lens, during zooming, each lens unit is configured to move such that distances among the lens units vary. The first lens unit consists of three lenses. A relative partial dispersion θgF and an Abbe number vd of a material of the positive lens included in the first lens unit are appropriately set by satisfying predetermined mathematical conditions.

15 Claims, 29 Drawing Sheets

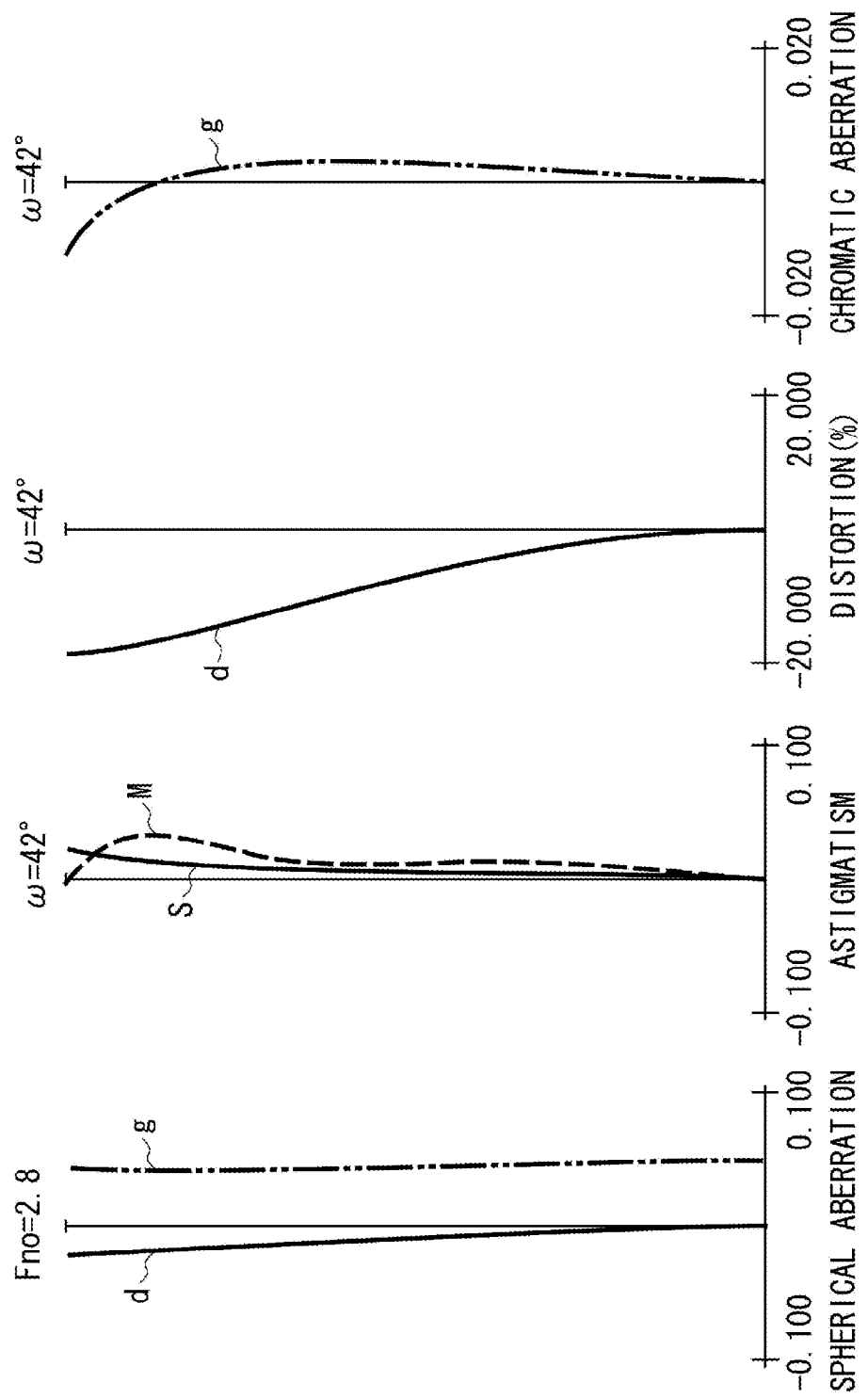

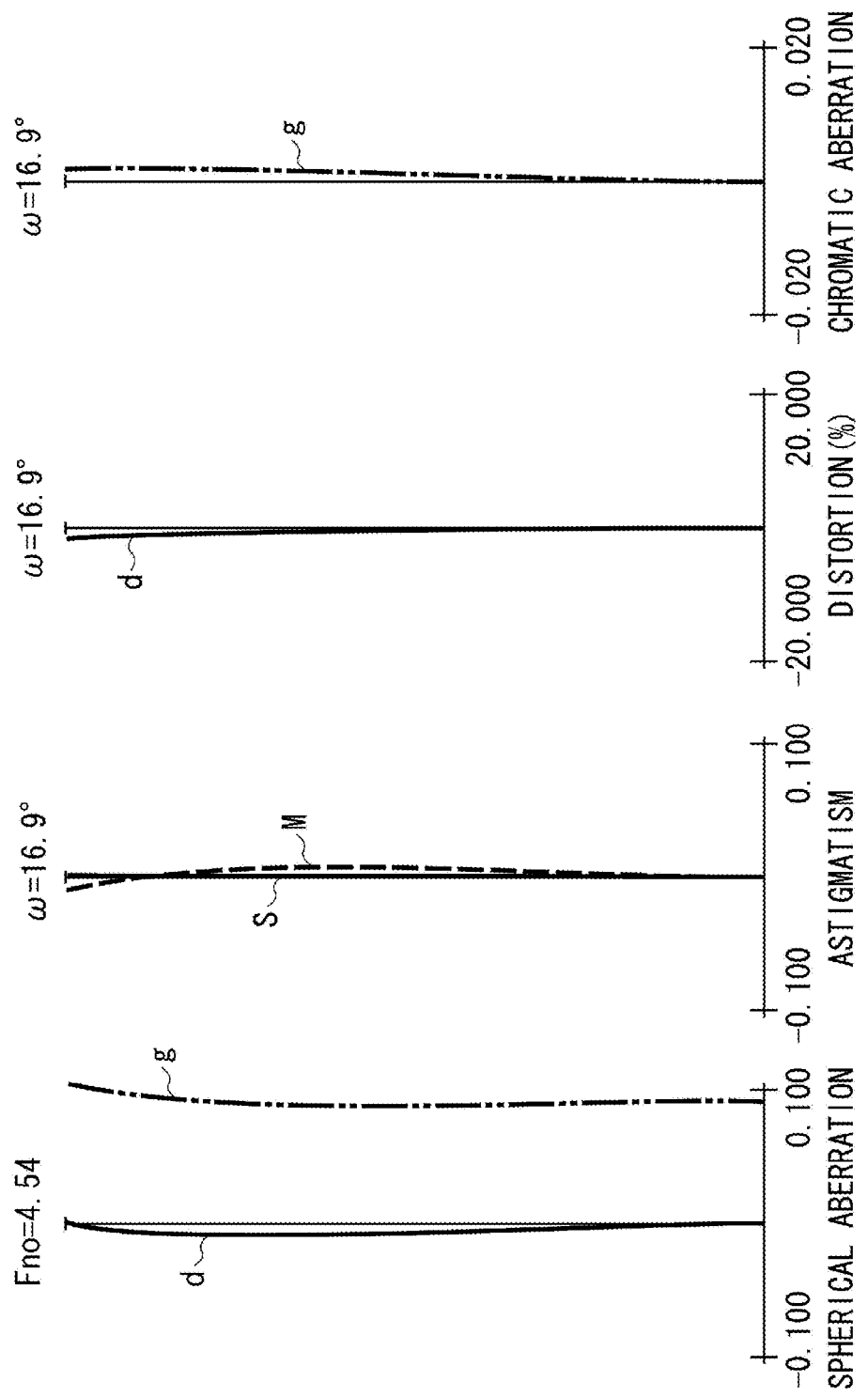

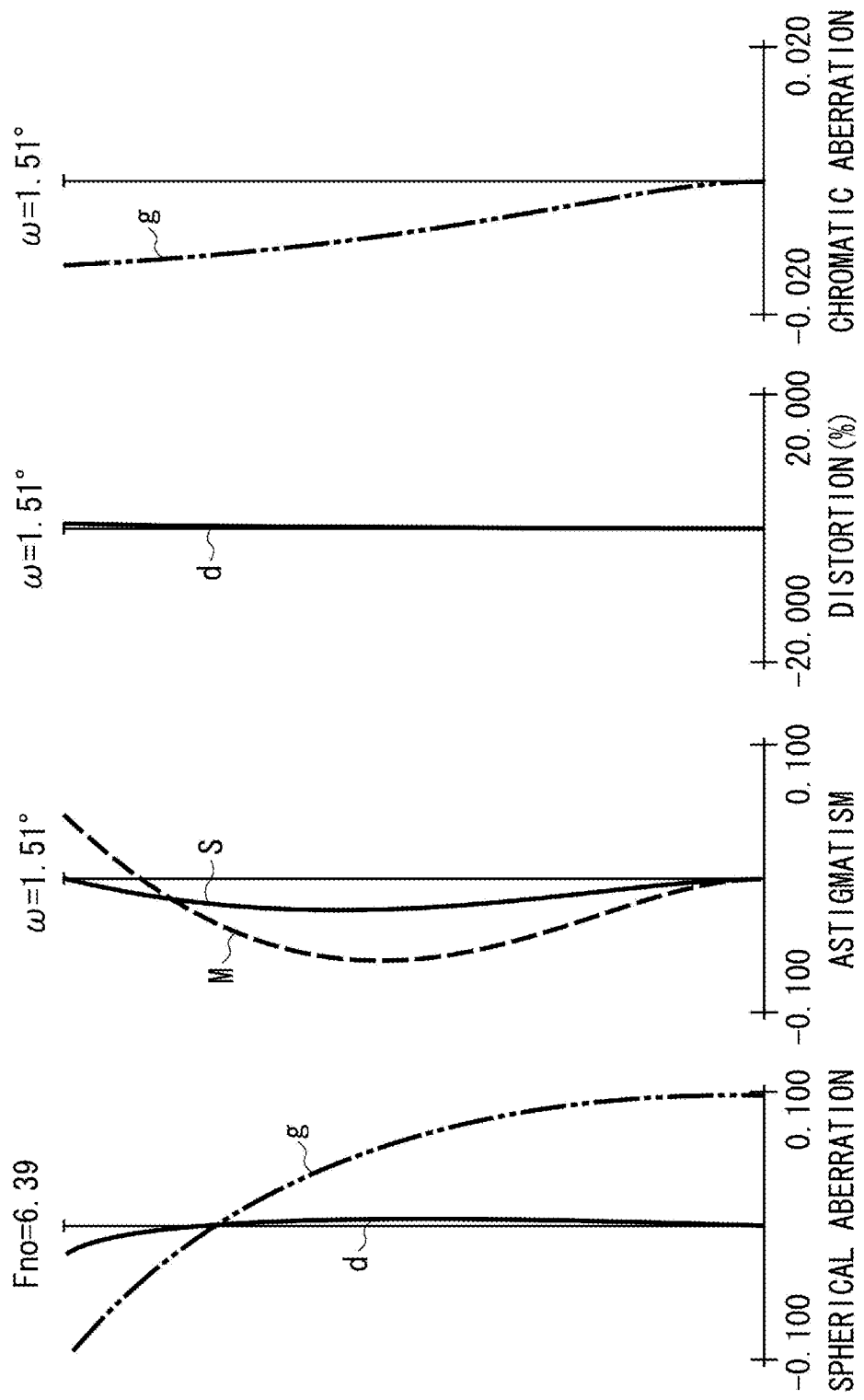

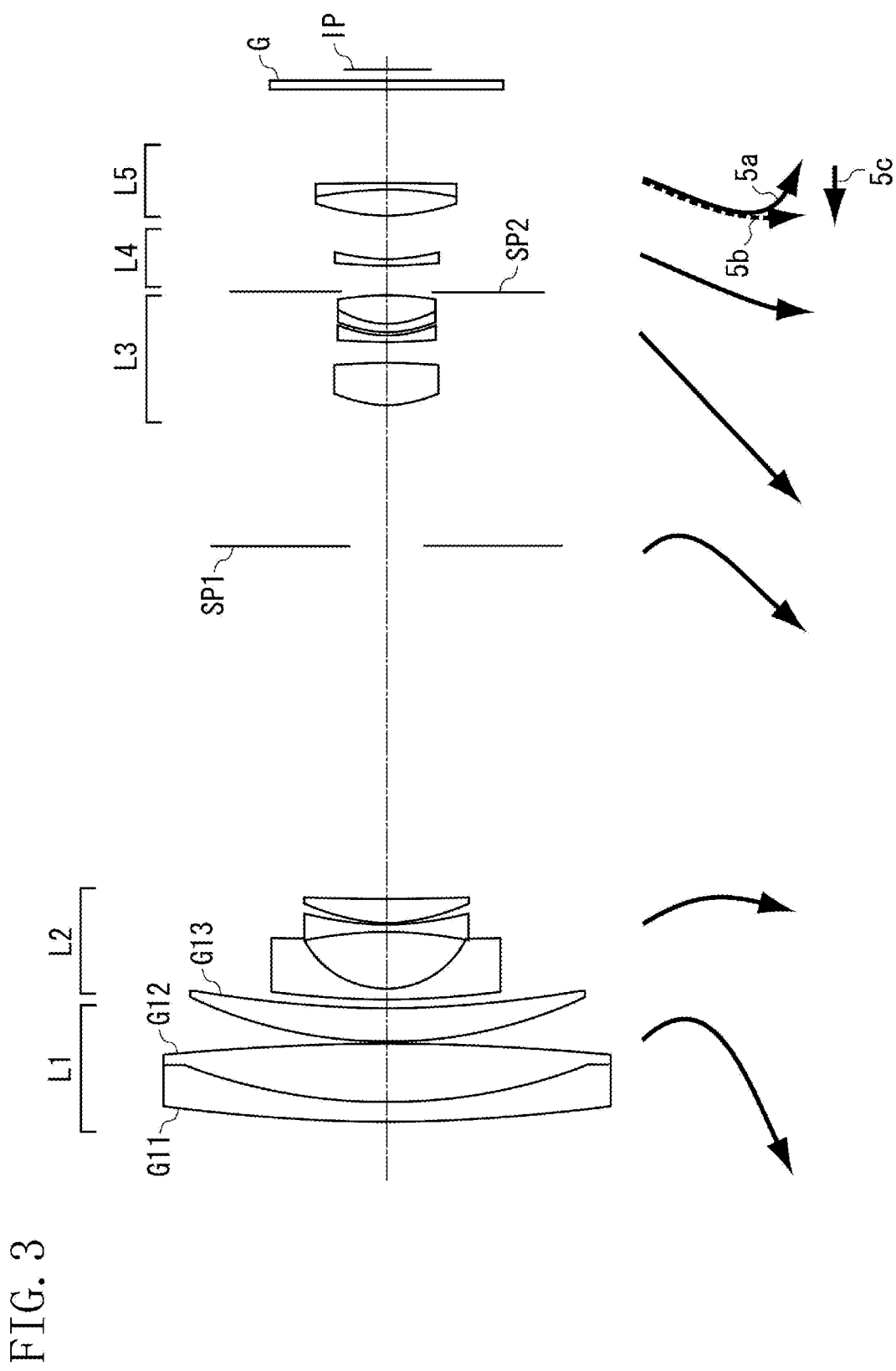

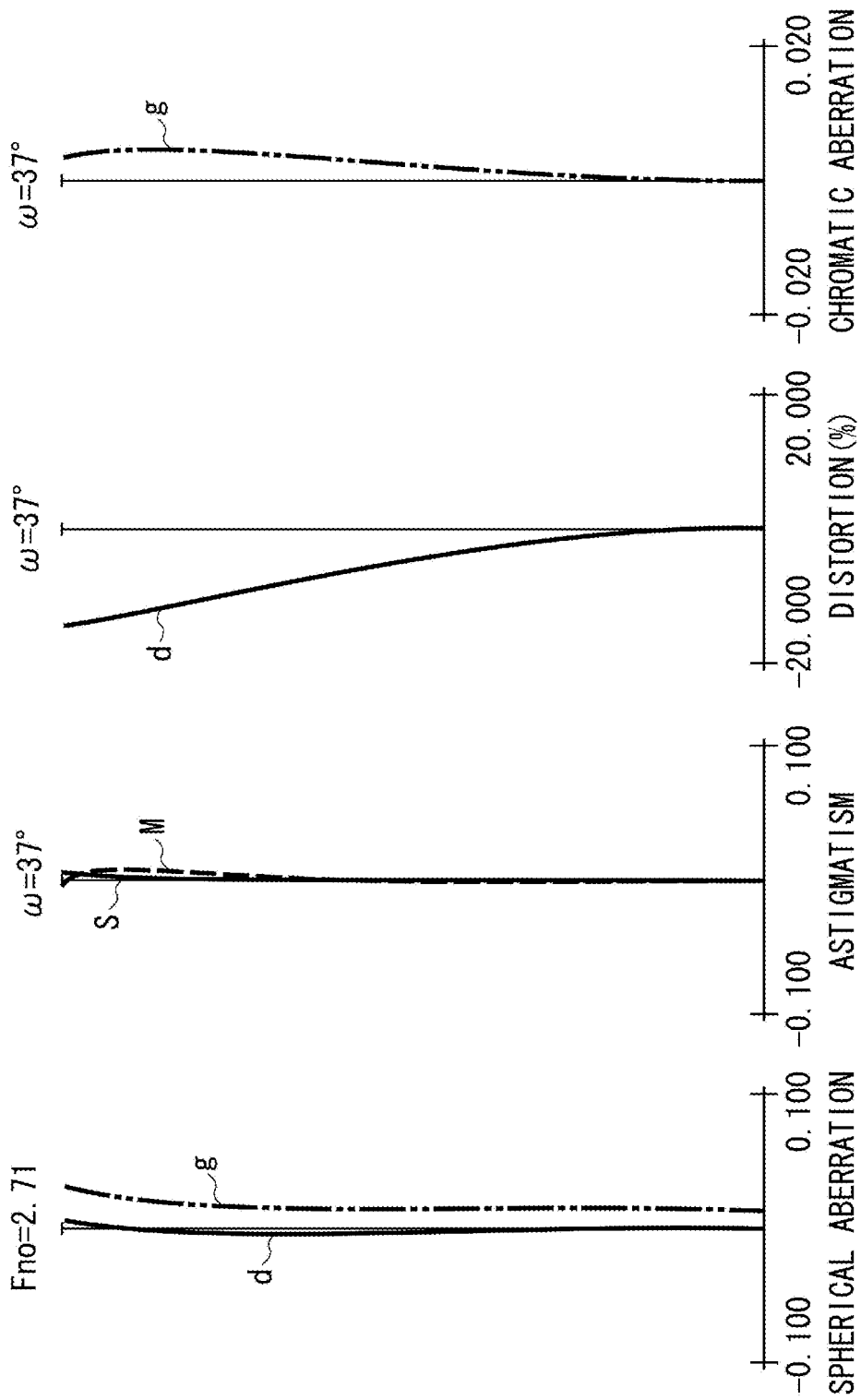

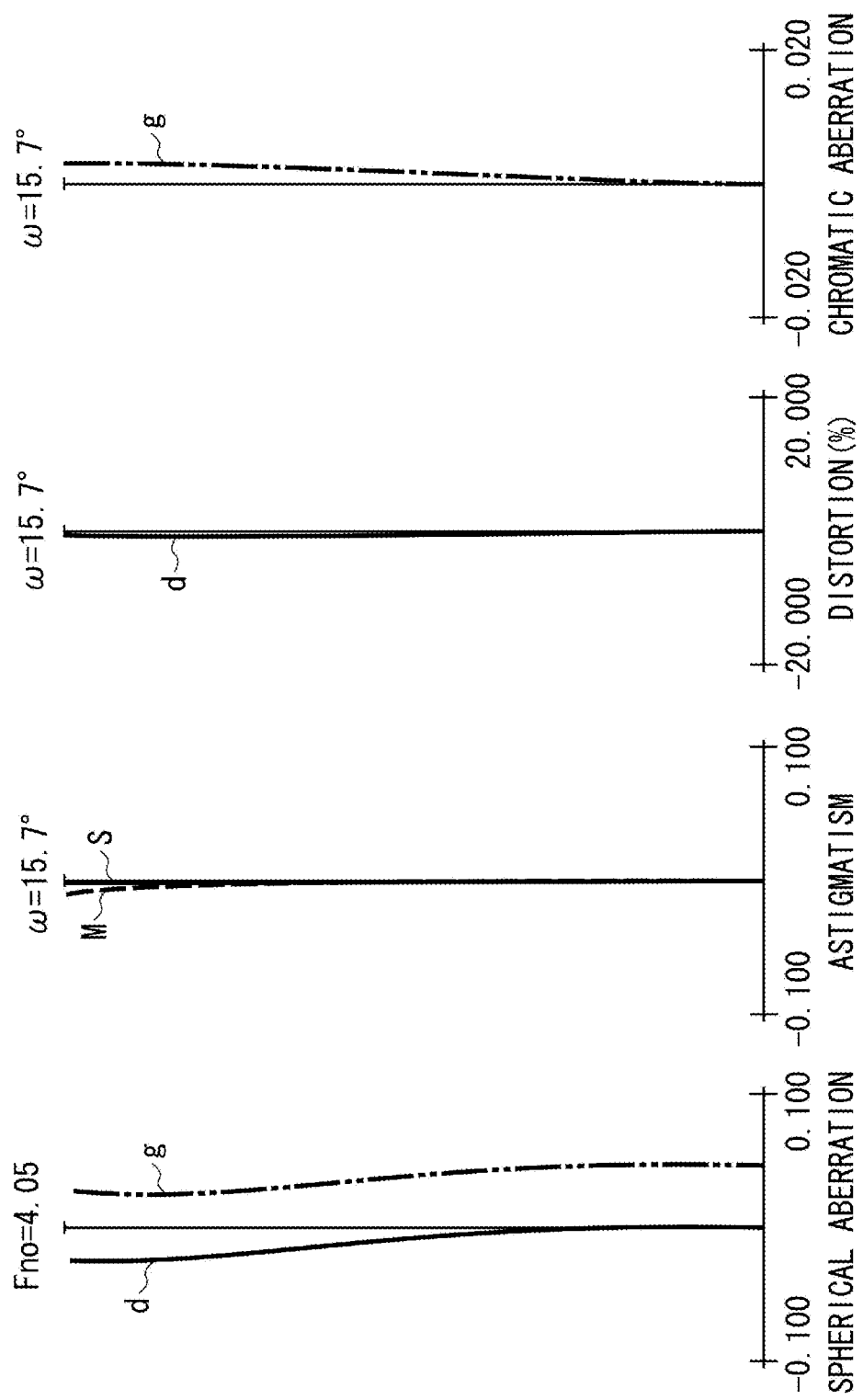

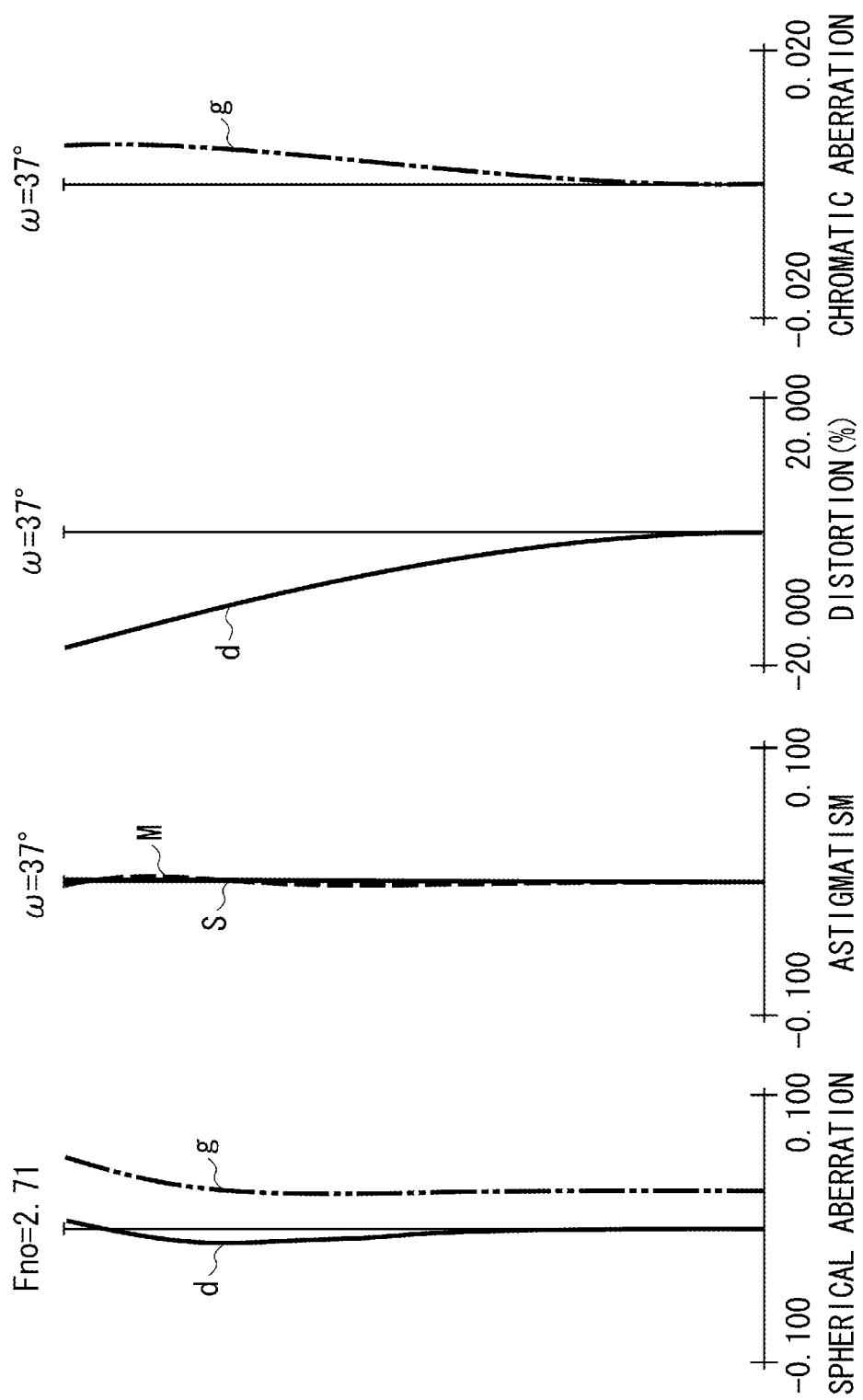

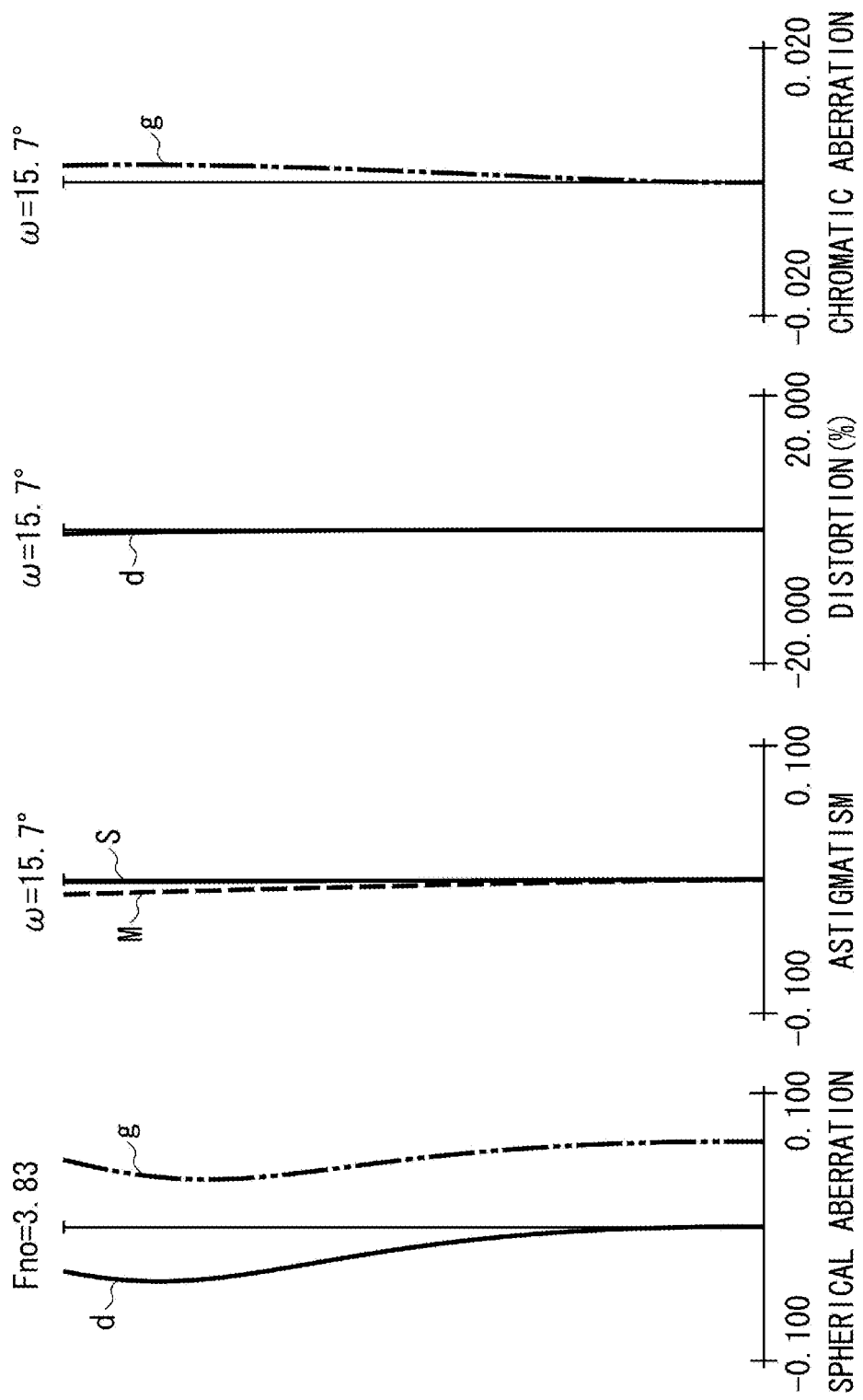

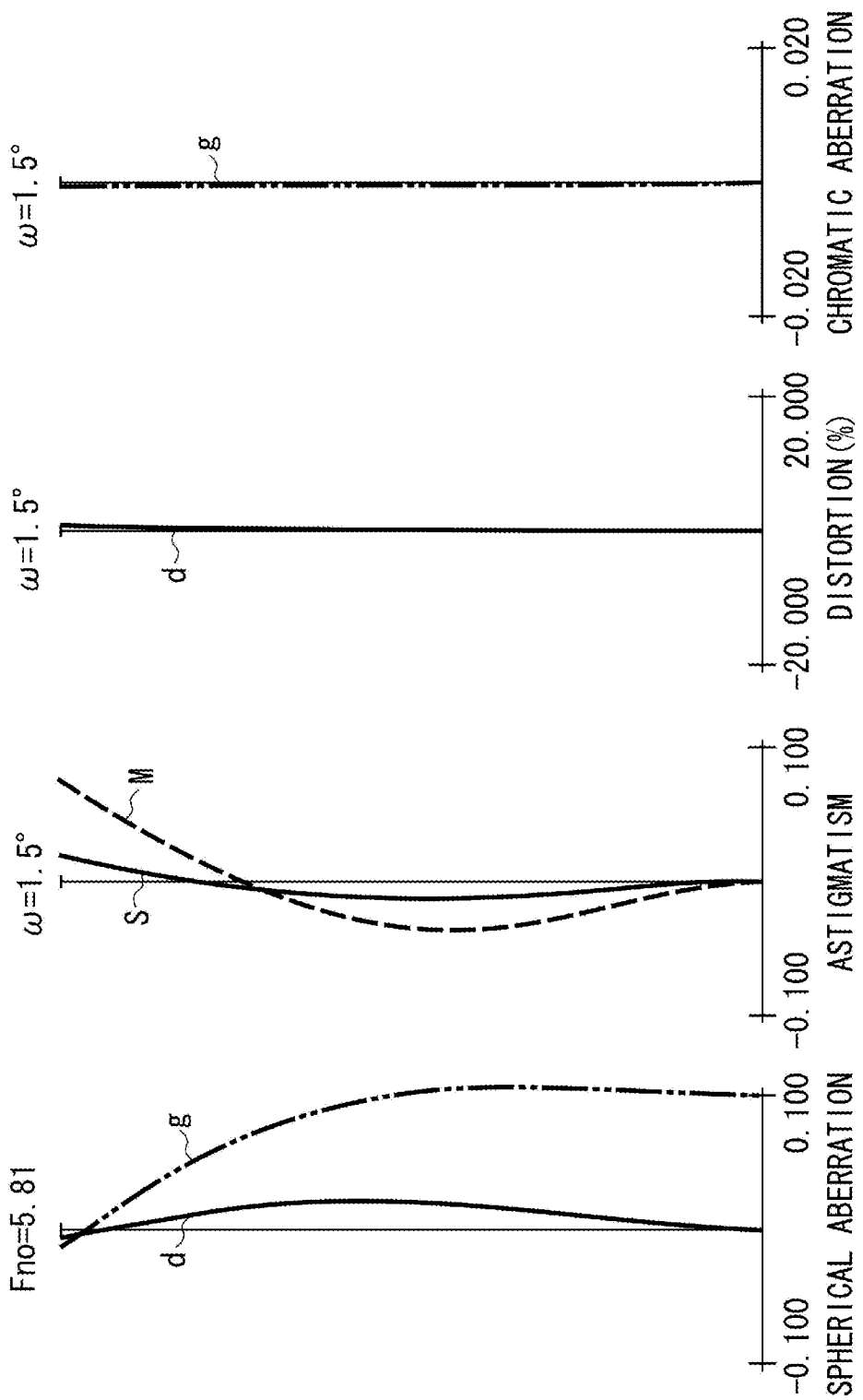

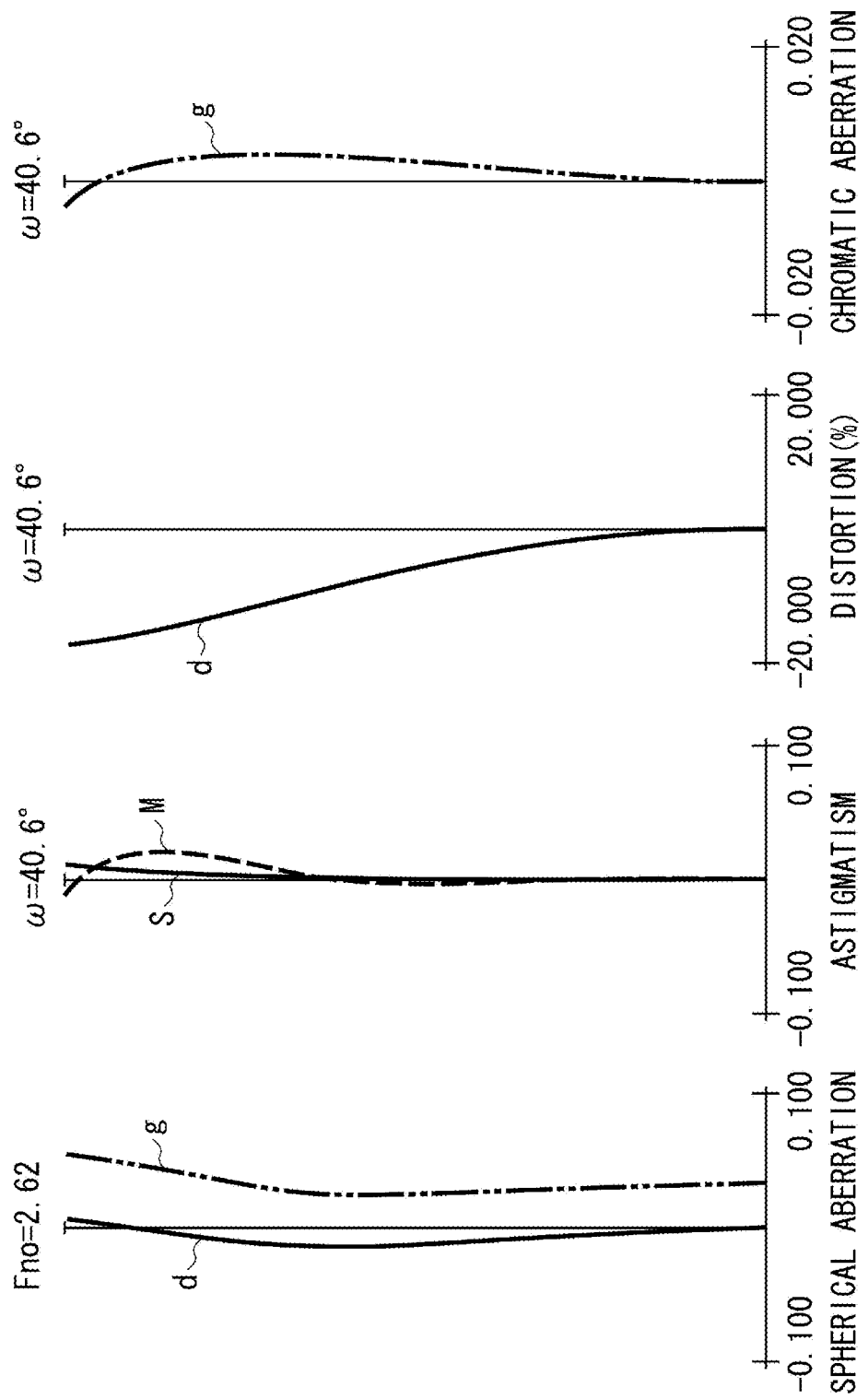

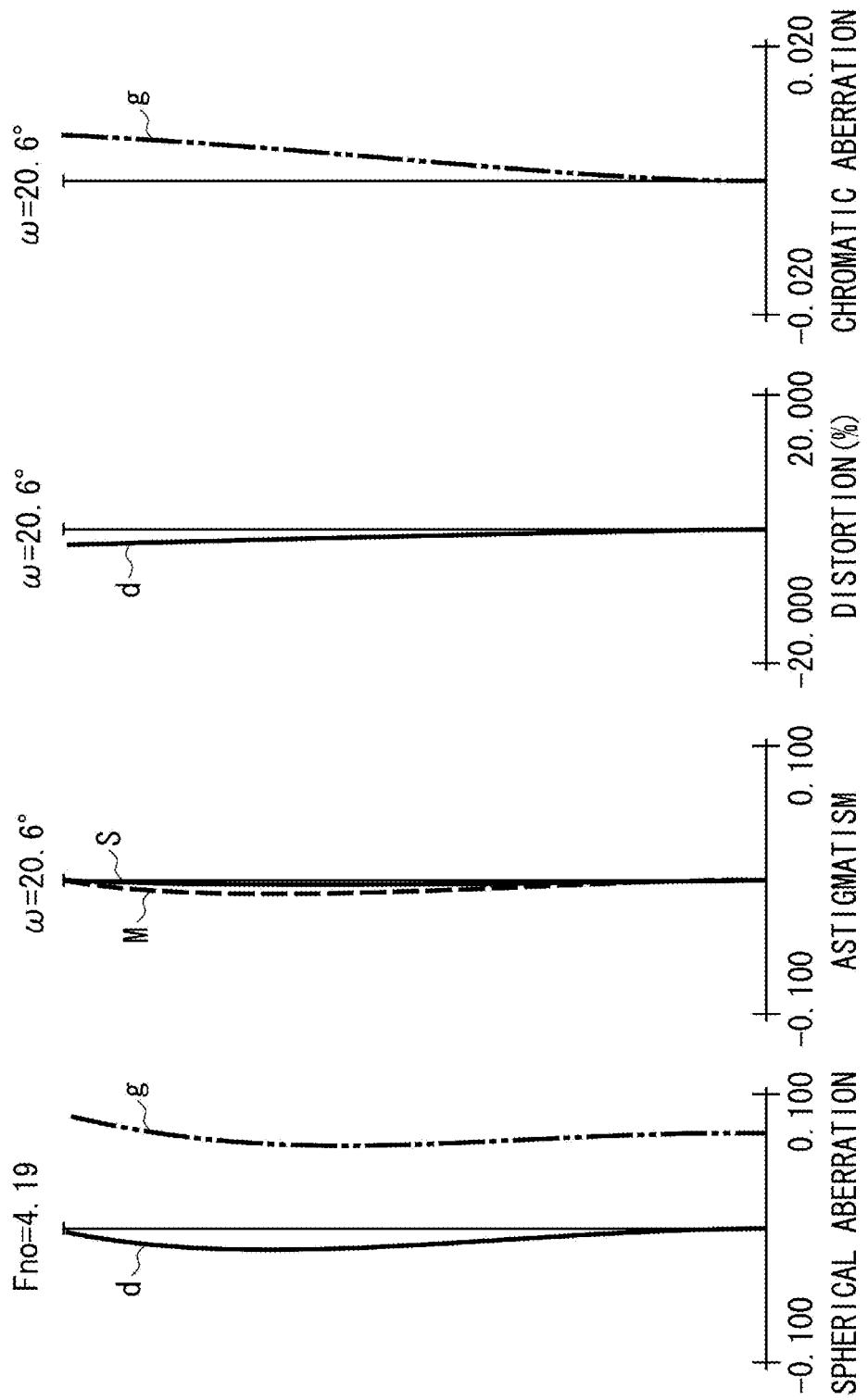

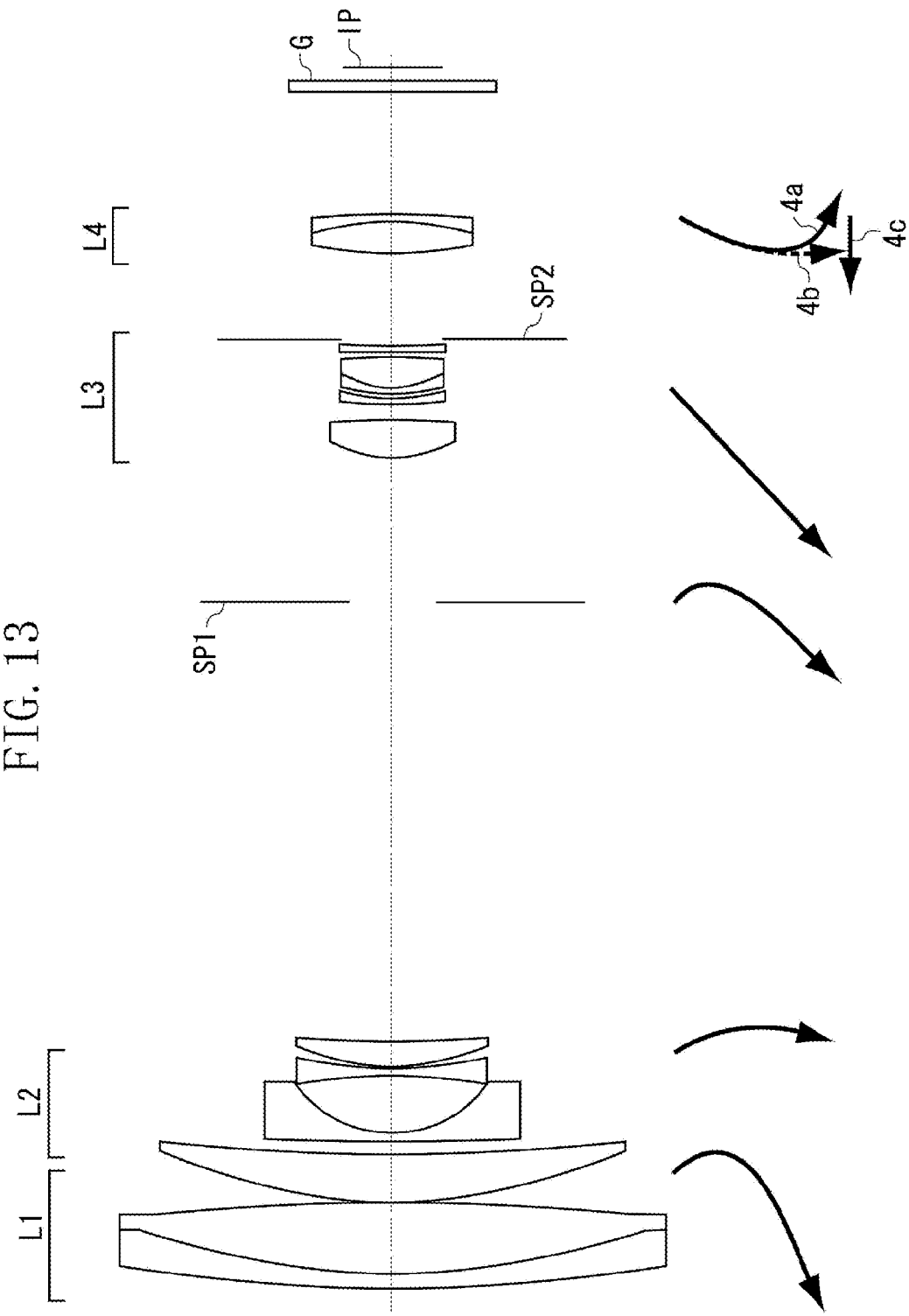

ZOOM LENS AND IMAGE PICKUP APPARATUS WITH ZOOM LENS

BACKGROUND OF THE INVENTION

1. Field of the Invention

The present invention relates to a zoom lens and an image pickup apparatus equipped with the zoom lens. In particular, the present invention relates to a zoom lens useful for a digital camera, a video camera, a television (TV) camera, a monitoring camera, a silver-halide film camera, and the like.

2. Related Background Art

A photographic lens used in an image pickup apparatus, such as a digital camera and a video camera, generally includes a zoom lens. According to current market preferences, it is desired a zoom lens having a wide angle of view and a high zoom ratio that can offer high optical performance for the entire zoom range.

As a zoom lens having a high zoom ratio, a positive-lead type zoom lens has been widely used. In the positive-lead type zoom lens, a lens unit having a positive refractive power is positioned closest to an object to be imaged. U.S. Pat. No. 6,594,087 discusses a zoom lens that uses an anomalous dispersion material as a material of a lens constituting a first lens unit and having a zoom ratio of about 10. In addition, U.S. Pat. No. 7,304,805 discusses a five-unit zoom lens including, in order from the object side to the image side, positive, negative, positive, negative, and positive lens units, in which a lens of the first lens unit is made of an anomalous dispersion material.

In a positive-lead type zoom lens, it is relatively easy to achieve a high zoom ratio while reducing the total size of the zoom lens. However, if the zoom ratio and the angle of view are increased and expanded in the positive-lead type zoom lens, the secondary spectrum of chromatic aberration of magnification and that of axial chromatic aberration may increase in the zoom range closer to a wide-angle end and in the zoom range closer to a telephoto end, respectively.

In order to achieve a high optical performance for the entire zoom range while achieving a high zoom ratio and a wide angle of view at the same time in the positive-lead type zoom lens, it is significant to reduce chromatic aberration, in particular, the secondary spectrum thereof. In order to reduce chromatic aberration, a low-dispersion lens made of an anomalous dispersion material can be provided and used at an appropriate location in the zoom lens.

In addition, in order to reduce chromatic aberration, it is significant to provide an optimal refractive power to each lens unit constituting the zoom lens based on the characteristics (an Abbe number and a relative partial dispersion) of the material of the lens. In particular, in the above-described positive-lead type five-unit zoom lens, an axial ray passes through the first lens unit having a positive refractive power at the highest vertical level.

Accordingly, if a high zoom ratio is desired, it becomes difficult to reduce the secondary spectrum occurring at the telephoto end unless the material having the appropriate characteristics is used as a material of the lens constituting the first lens unit. If the amount of the secondary spectrum is large, it becomes difficult to achieve a high optical performance for the entire zoom range.

SUMMARY OF THE INVENTION

The present invention is directed to a positive-lead type zoom lens capable of reducing the amount of chromatic aberration occurring at the telephoto end and having a high zoom ratio and a high optical performance for the entire zoom range and an image pickup apparatus equipped with the zoom lens.

According to an aspect of the present invention, a zoom lens includes, in order from an object side to an image side, a first lens unit having a positive refractive power, a second lens unit having a negative refractive power, and a third lens unit having a positive refractive power. During zooming, each lens unit is configured to move to cause distances among the lens units to vary. The first lens unit consists of three lenses, wherein, when $\theta gF$ is a relative partial dispersion of a material of a positive lens included in the first lens unit and $vd$ is an Abbe number of the material of the positive lens included in the first lens unit, the following conditions are satisfied:

$$55.0 < vd < 100.0$$

$$0.52 < \theta gF < 0.59$$

$$\theta gF + 0.00163 \times vd > 0.65.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B and 2C are aberration charts of the zoom lens respectively at the wide-angle end, at a middle focal length and at the telephoto end, according to the first exemplary embodiment of the present invention.

FIG. 3 is a lens cross section of a zoom lens at the wide-angle end, according to a second exemplary embodiment of the present invention.

FIGS. 4A, 4B and 4C are aberration charts of the zoom lens respectively at the wide-angle end, at a middle focal length and at the telephoto end, according to the second exemplary embodiment of the present invention.

FIGS. 6A, 6B and 6C are aberration charts of the zoom lens respectively at the wide-angle end, at a middle focal length and at the telephoto end, according to the third exemplary embodiment of the present invention.

FIGS. 8A, 8B and 8C are aberration charts of the zoom lens respectively at the wide-angle end, at a middle focal length and at the telephoto end, according to the fourth exemplary embodiment of the present invention.

FIG. 13 is a lens cross section of a zoom lens at the wide-angle end according to a seventh exemplary embodiment of the present invention.

DESCRIPTION OF THE EMBODIMENTS

Various exemplary embodiments, features, and aspects of the invention will be described in detail below with reference to the drawings. As used herein, the side of a lens where an object to be imaged is located is referred to as the "object side" or front side of the lens; and the side of the lens where the image of the object is formed is referred to as the "image side" or back side of the lens.

A zoom lens according to an exemplary embodiment of the present invention includes, in order from the object side to the image side, a first lens unit having a positive refractive power, a second lens unit having a negative refractive power, and a third lens unit having a positive refractive power. During zooming, each lens unit is moved to change the distances among the lens units.

Figure 1:
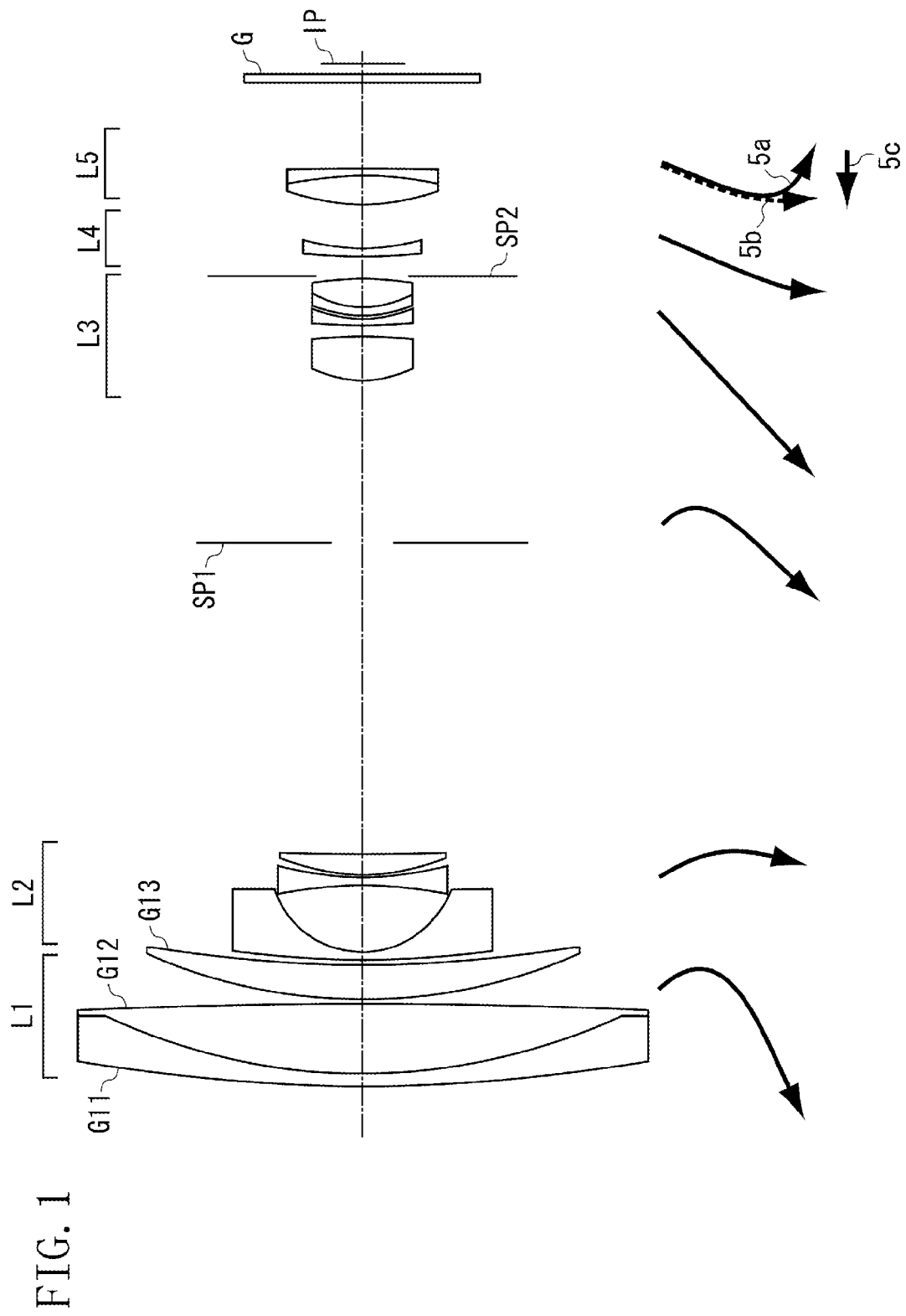
FIG. 1 is a lens cross section of a zoom lens at the wide-angle end, according to a first exemplary embodiment of the present invention.

FIG. 1 is a lens cross section of a zoom lens according to a first exemplary embodiment of the present invention at the wide-angle end. FIGS. 2A through 2C are aberration charts of the zoom lens according to the first exemplary embodiment at the wide-angle end (a short focal length end), at a middle focal length, and at the telephoto end (a long focal length end). The first exemplary embodiment is a zoom lens having a zoom ratio of 40.7 and an aperture ratio of about 2.4 to 5.9.

Figure 4C:
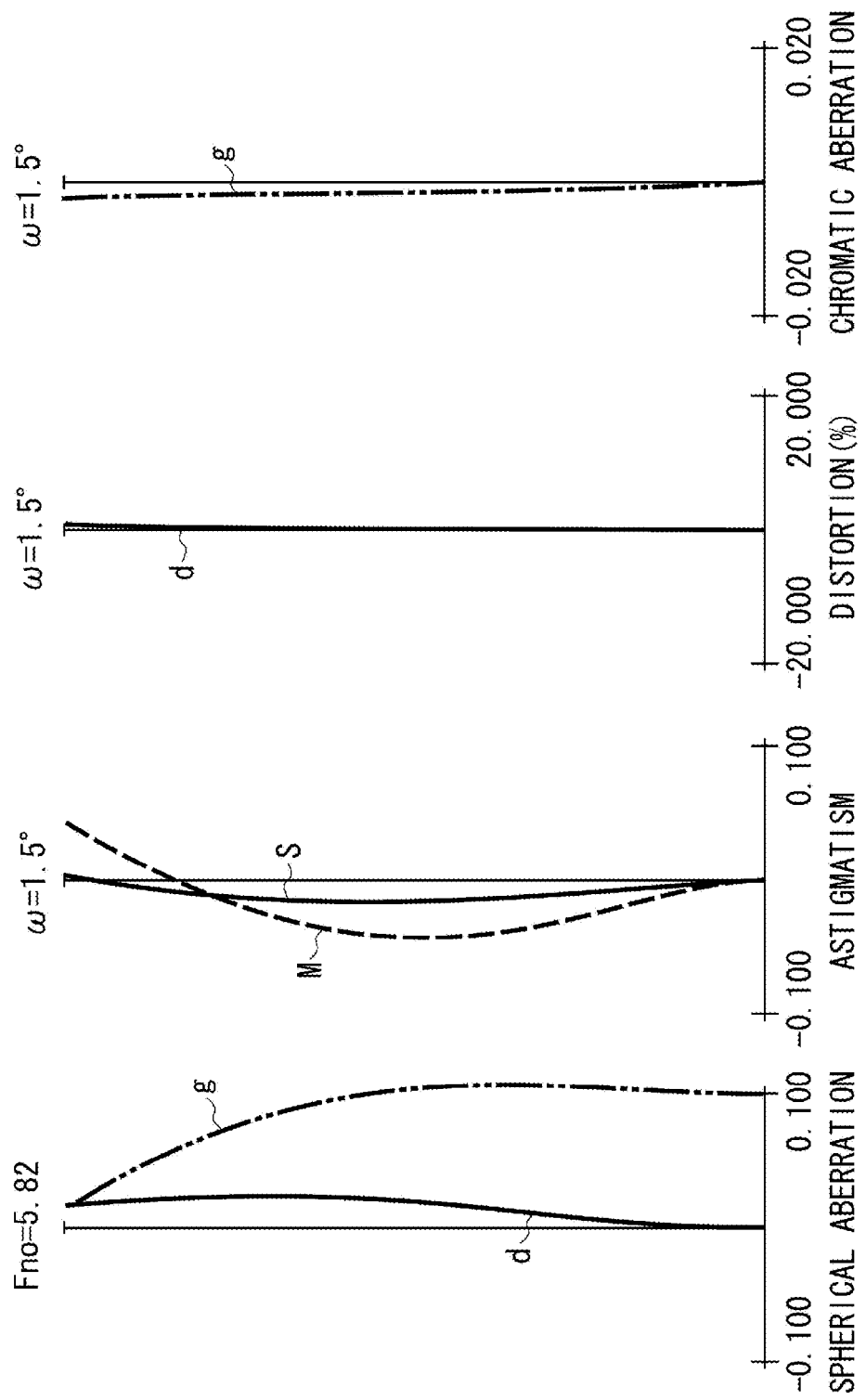

FIG. 3 is a lens cross section of a zoom lens according to a second exemplary embodiment of the present invention at the wide-angle end. FIGS. 4A through 4C are aberration charts of the zoom lens according to the second exemplary embodiment at the wide-angle end, at a middle focal length, and at the telephoto end. The second exemplary embodiment is a zoom lens of a zoom ratio of 33.6 and an aperture ratio of about 2.7 to 5.8.

Figure 5:
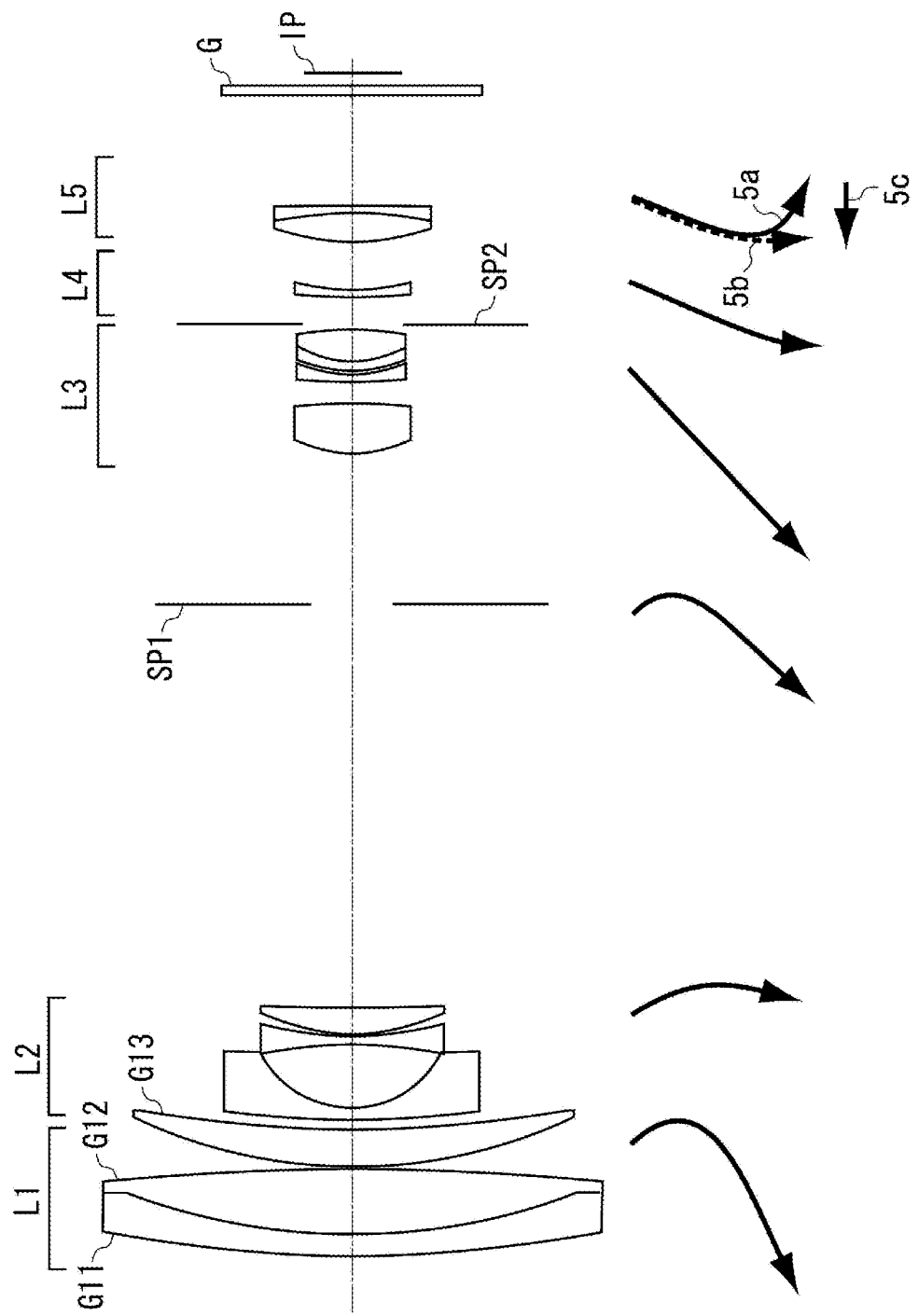
FIG. 5 is a lens cross section of a zoom lens at the wide-angle end, according to a third exemplary embodiment of the present invention.

FIG. 5 is a lens cross section of a zoom lens according to a third exemplary embodiment of the present invention at the wide-angle end. FIGS. 6A through 6C are aberration charts of the zoom lens according to the third exemplary embodiment at the wide-angle end, at a middle focal length, and at the telephoto end. The third exemplary embodiment is a zoom lens of a zoom ratio of 33.5 and an aperture ratio of 2.7 to 5.8.

Figure 7:
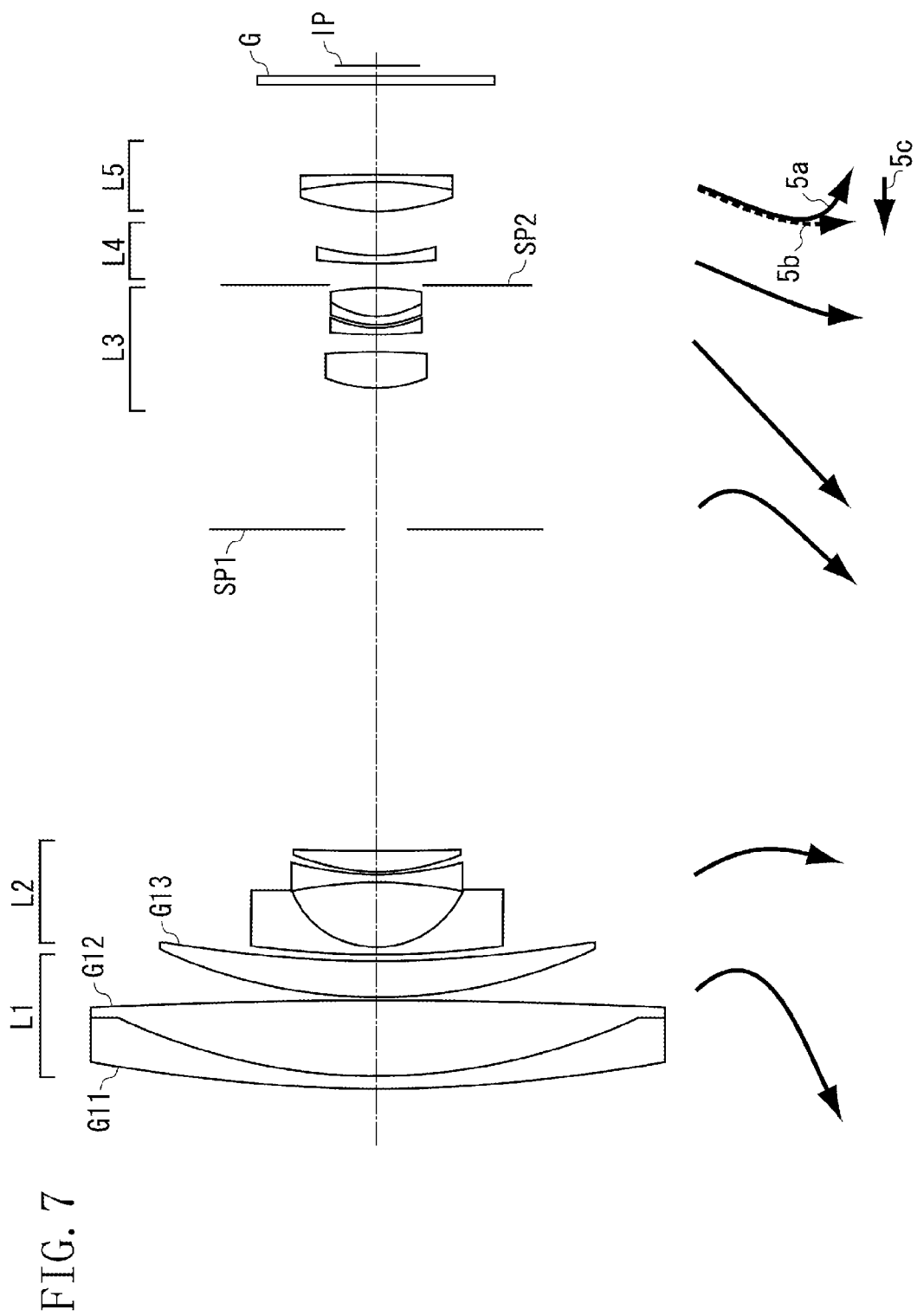
FIG. 7 is a lens cross section of a zoom lens at the wide-angle end, according to a fourth exemplary embodiment of the present invention.
Figure 8C:
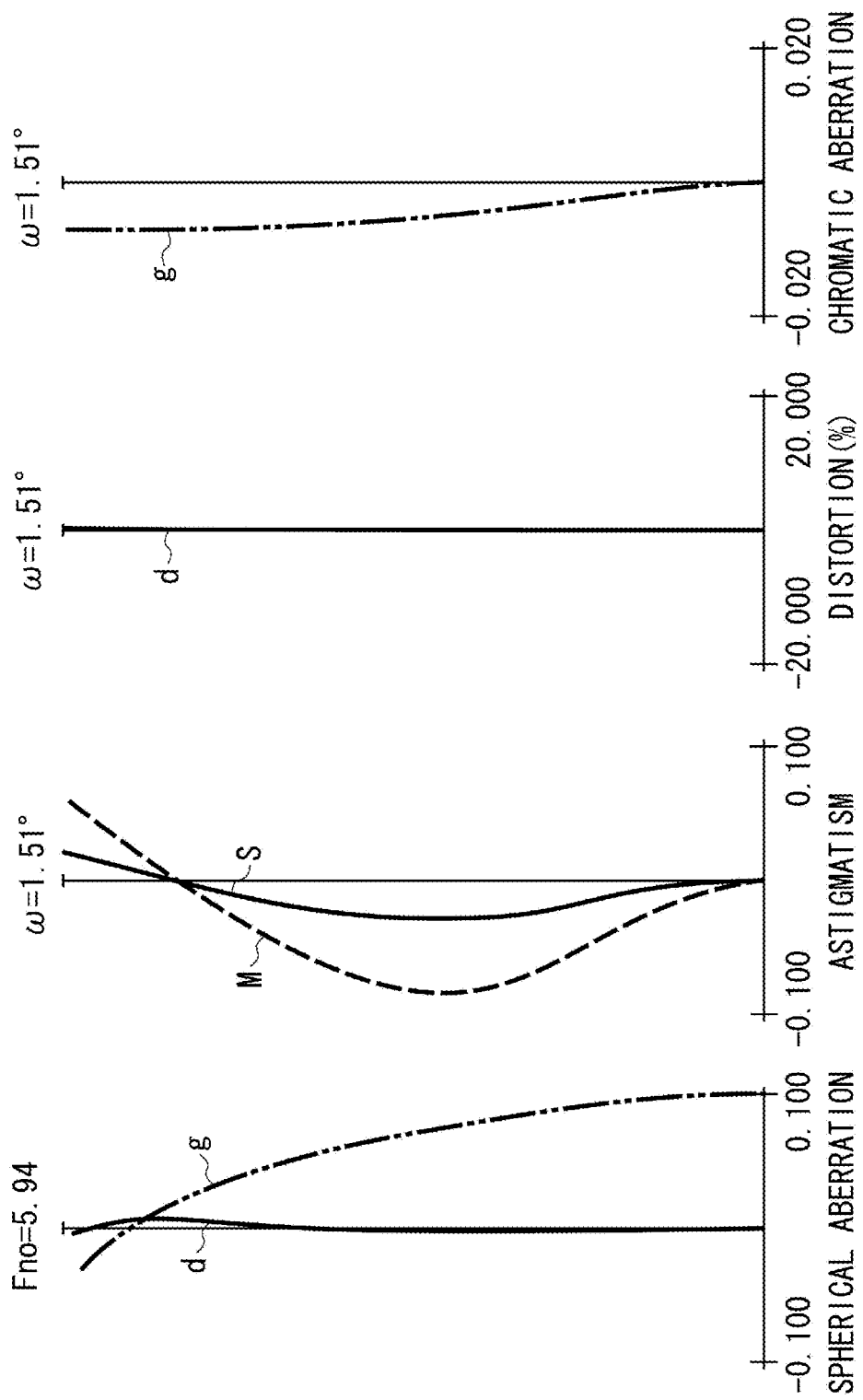

FIG. 7 is a lens cross section of a zoom lens according to a fourth exemplary embodiment of the present invention at the wide-angle end. FIGS. 8A through 8C are aberration charts of the zoom lens according to the fourth exemplary embodiment at the wide-angle end, at a middle focal length, and at the telephoto end. The fourth exemplary embodiment is a zoom lens of a zoom ratio of 38.7 and an aperture ratio of 2.6 to 5.9.

Figure 9:
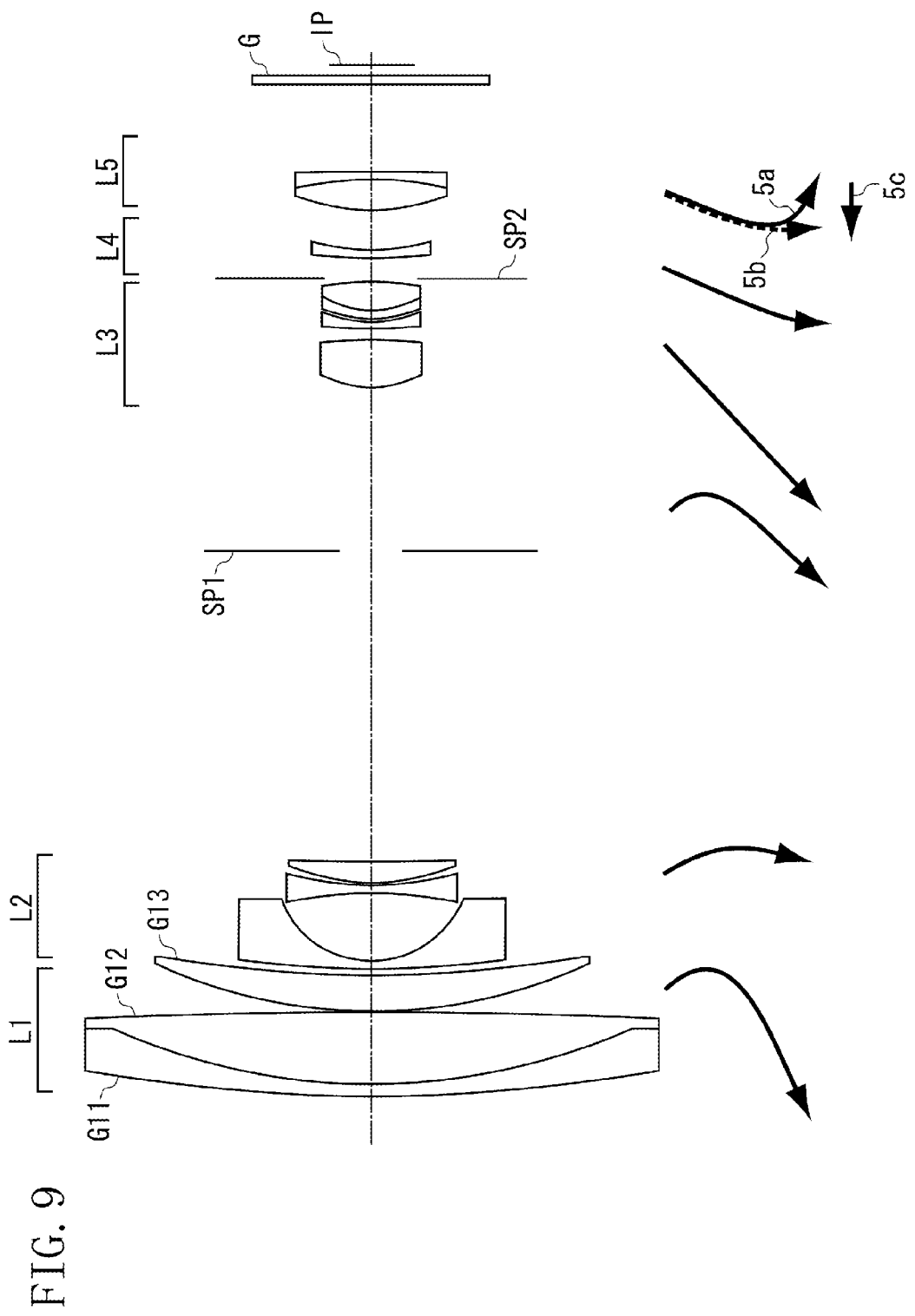
FIG. 9 is a lens cross section of a zoom lens at the wide-angle end according to a fifth exemplary embodiment of the present invention.
Figure 10A:
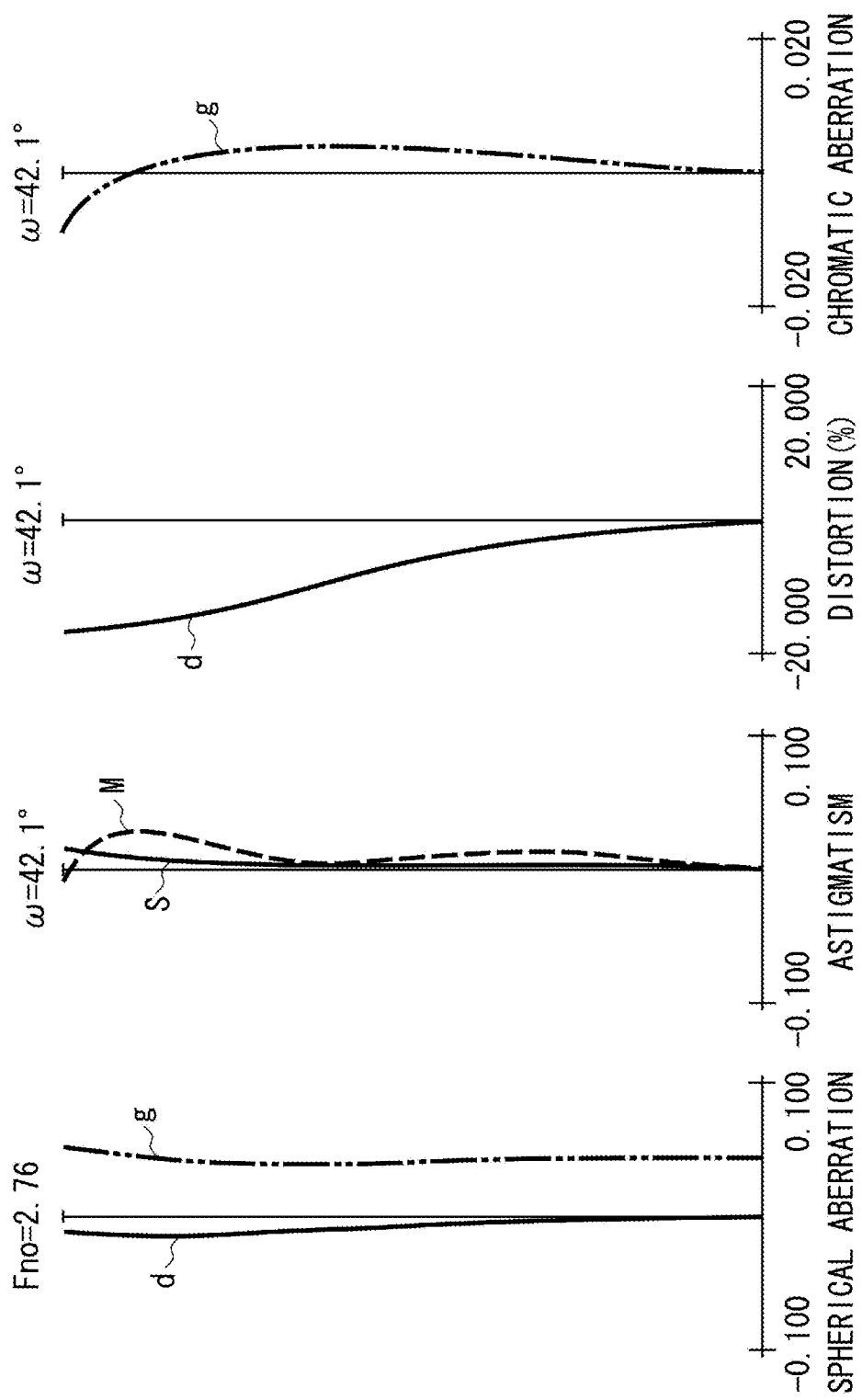
FIGS. 10A, 10B and 10C are aberration charts of the zoom lens respectively at the wide-angle end, at a middle focal length and at the telephoto end, according to the fifth exemplary embodiment of the present invention.
Figure 10B:
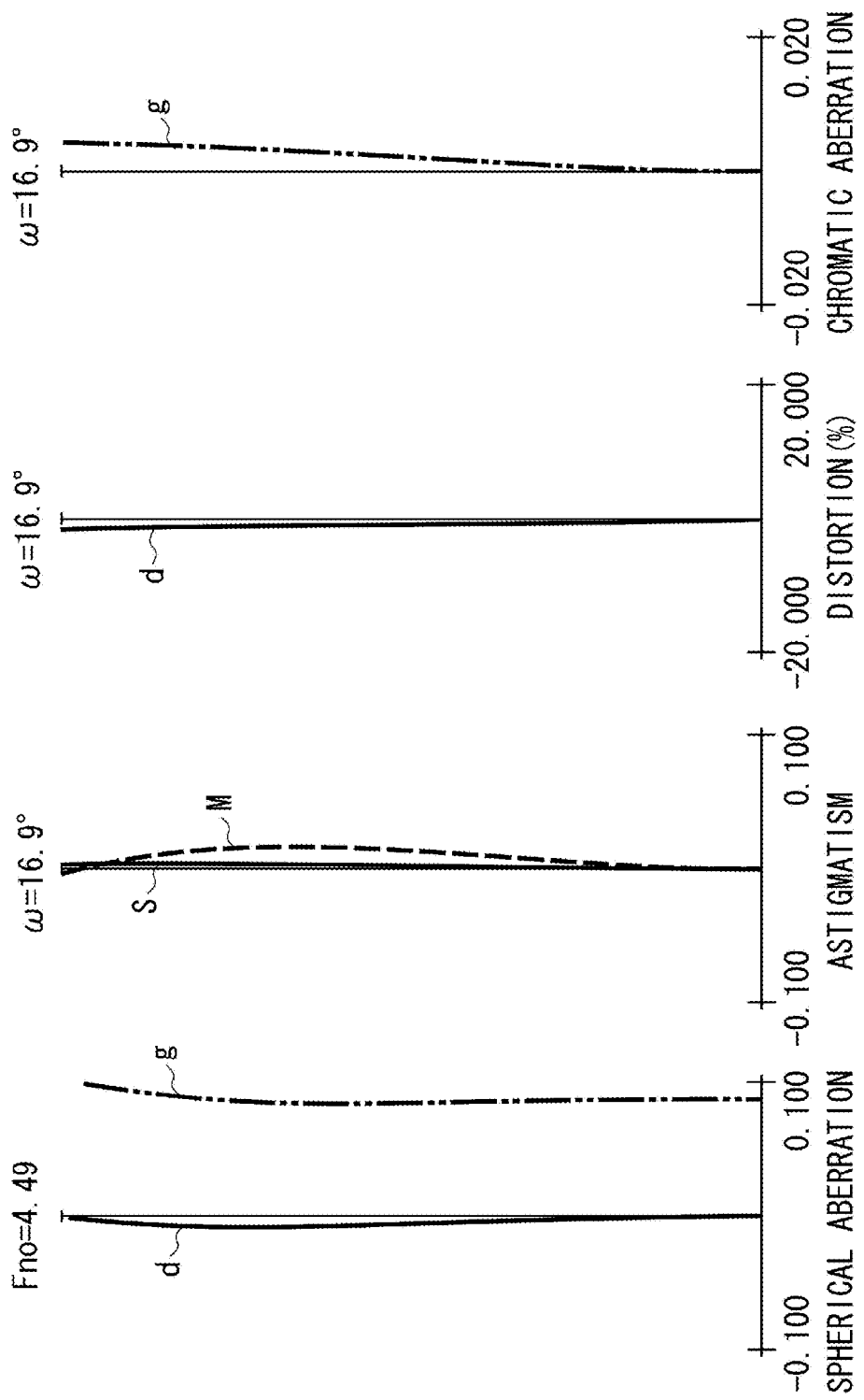
Figure 10C:
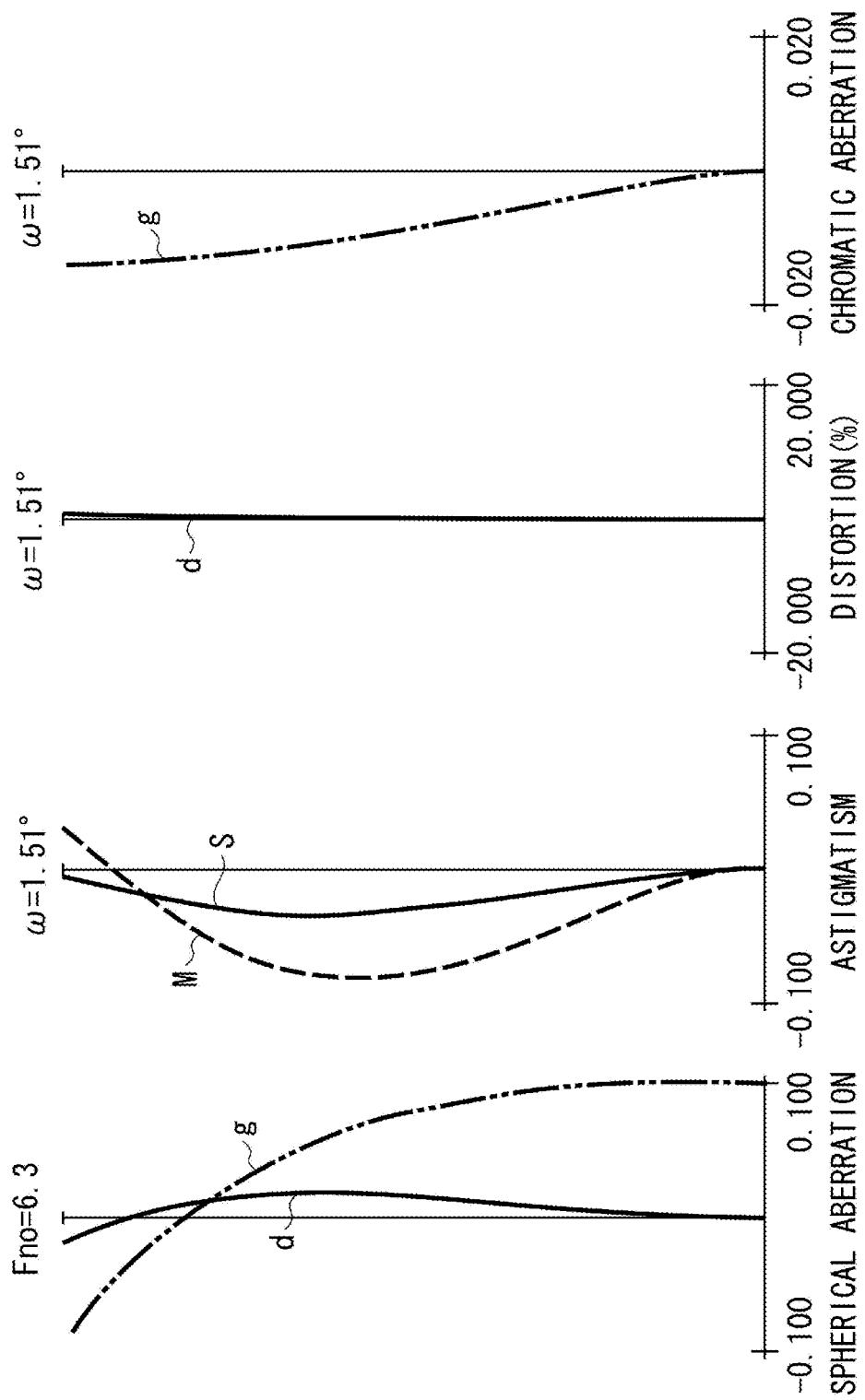

FIG. 9 is a lens cross section of a zoom lens according to a fifth exemplary embodiment of the present invention at the wide-angle end. FIGS. 10A through 10C are aberration charts of the zoom lens according to the fifth exemplary embodiment at the wide-angle end, at a middle focal length, and at the telephoto end. The fifth exemplary embodiment is a zoom lens of a zoom ratio of 40.8 and an aperture ratio of 2.4 to 5.9.

Figure 11:
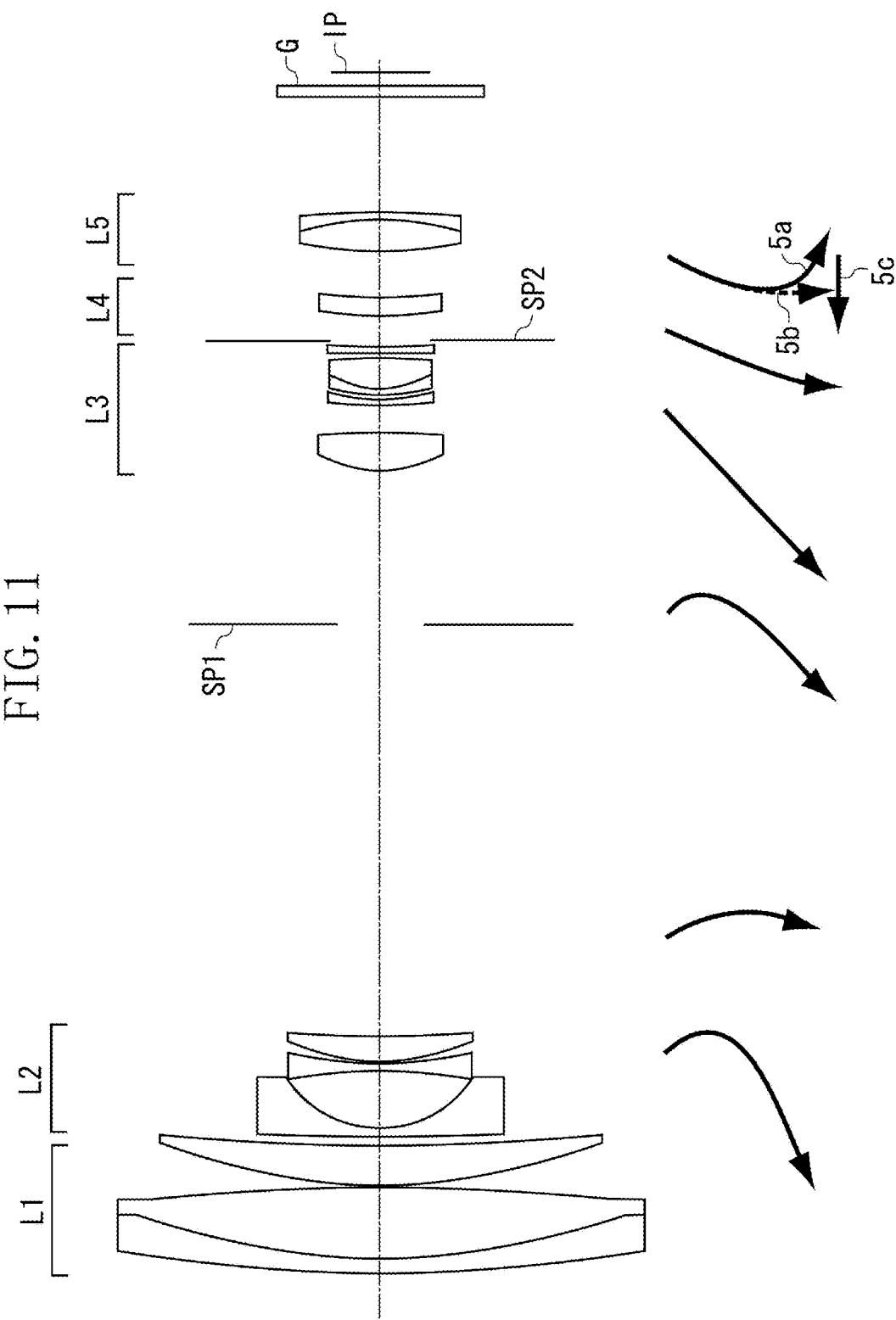
FIG. 11 is a lens cross section of a zoom lens at the wide-angle end according to a sixth exemplary embodiment of the present invention.
Figure 12A:
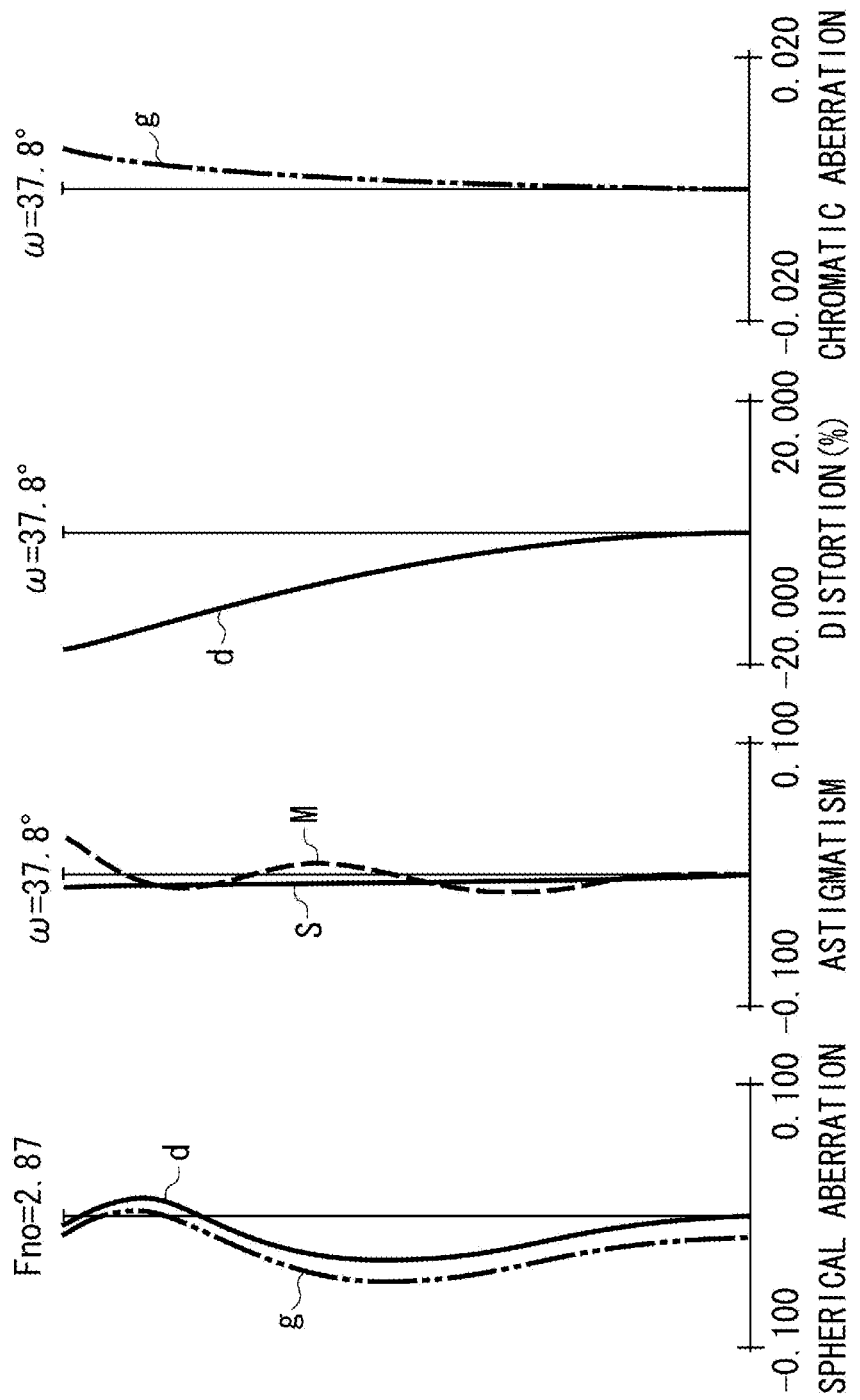
FIGS. 12A, 12B and 12C are aberration charts of the zoom lens respectively at the wide-angle end, at a middle focal length, and at the telephoto end, according to the sixth exemplary embodiment of the present invention.
Figure 12B:
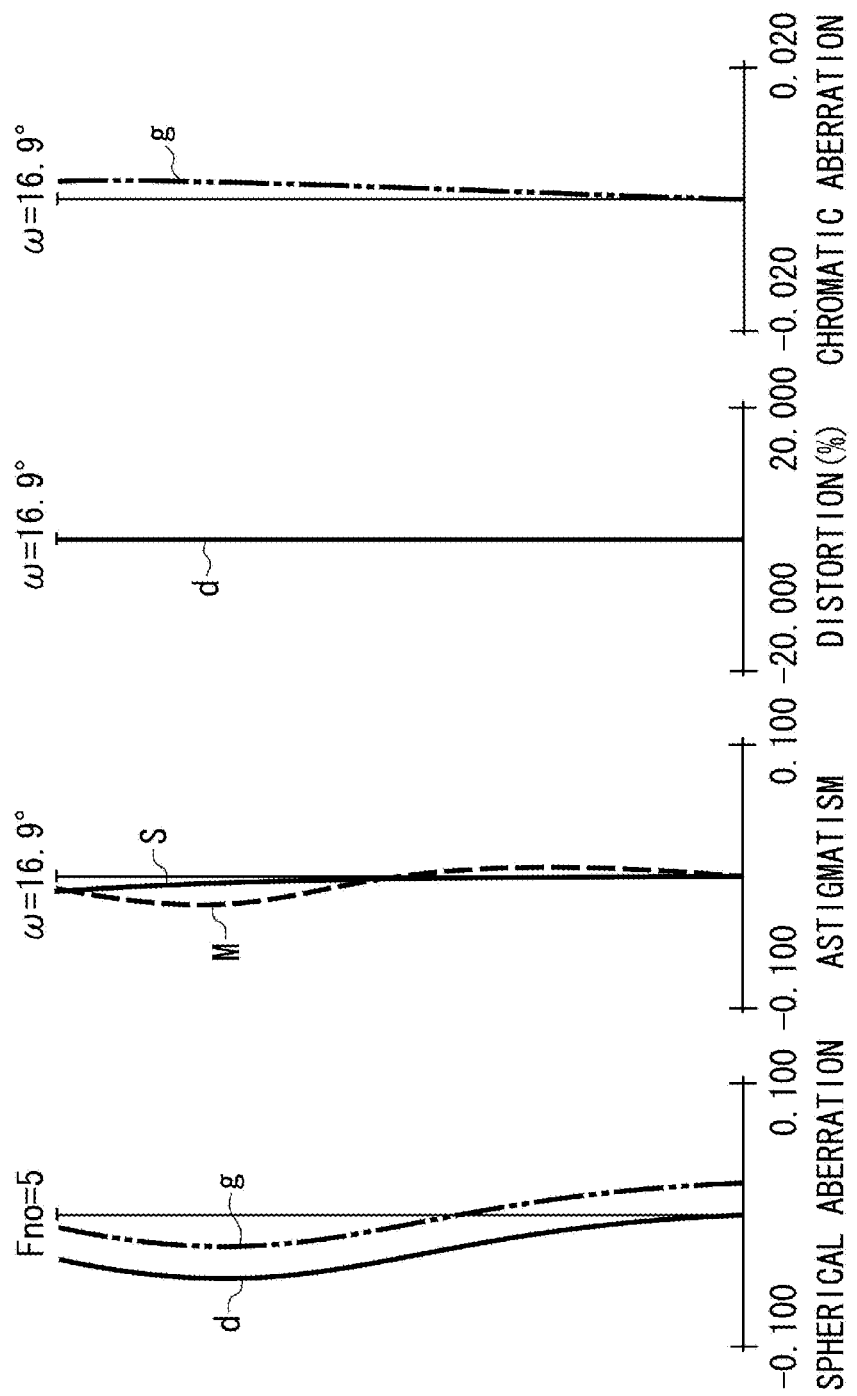
Figure 12C:
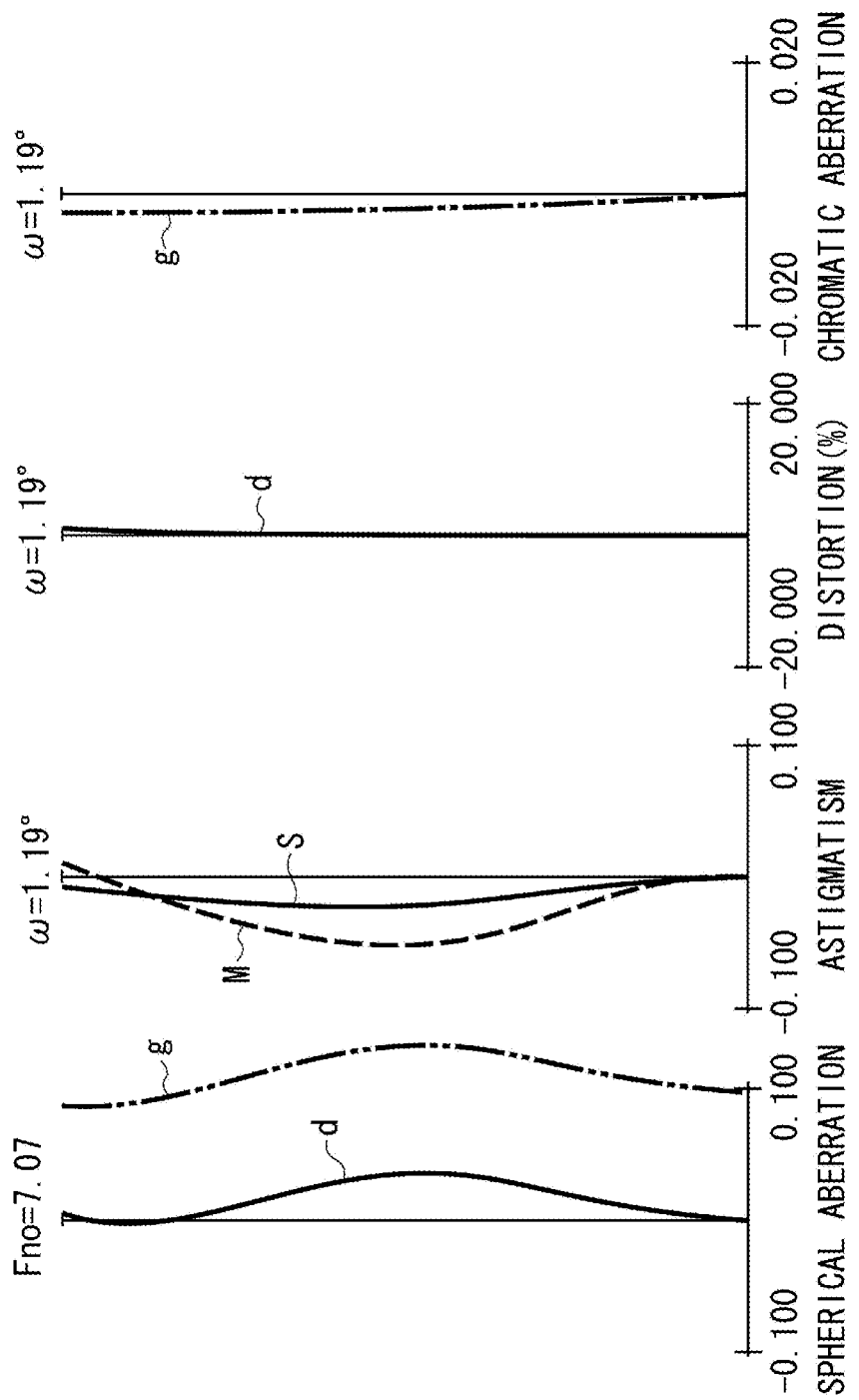

FIG. 11 is a lens cross section of a zoom lens according to a sixth exemplary embodiment of the present invention at the wide-angle end. FIGS. 12A through 12C are aberration charts of the zoom lens according to the sixth exemplary embodiment at the wide-angle end, at a middle focal length, and at the telephoto end. The sixth exemplary embodiment is a zoom lens of a zoom ratio of 43.5 and an aperture ratio of 2.9 to 7.1.

Figure 14A:
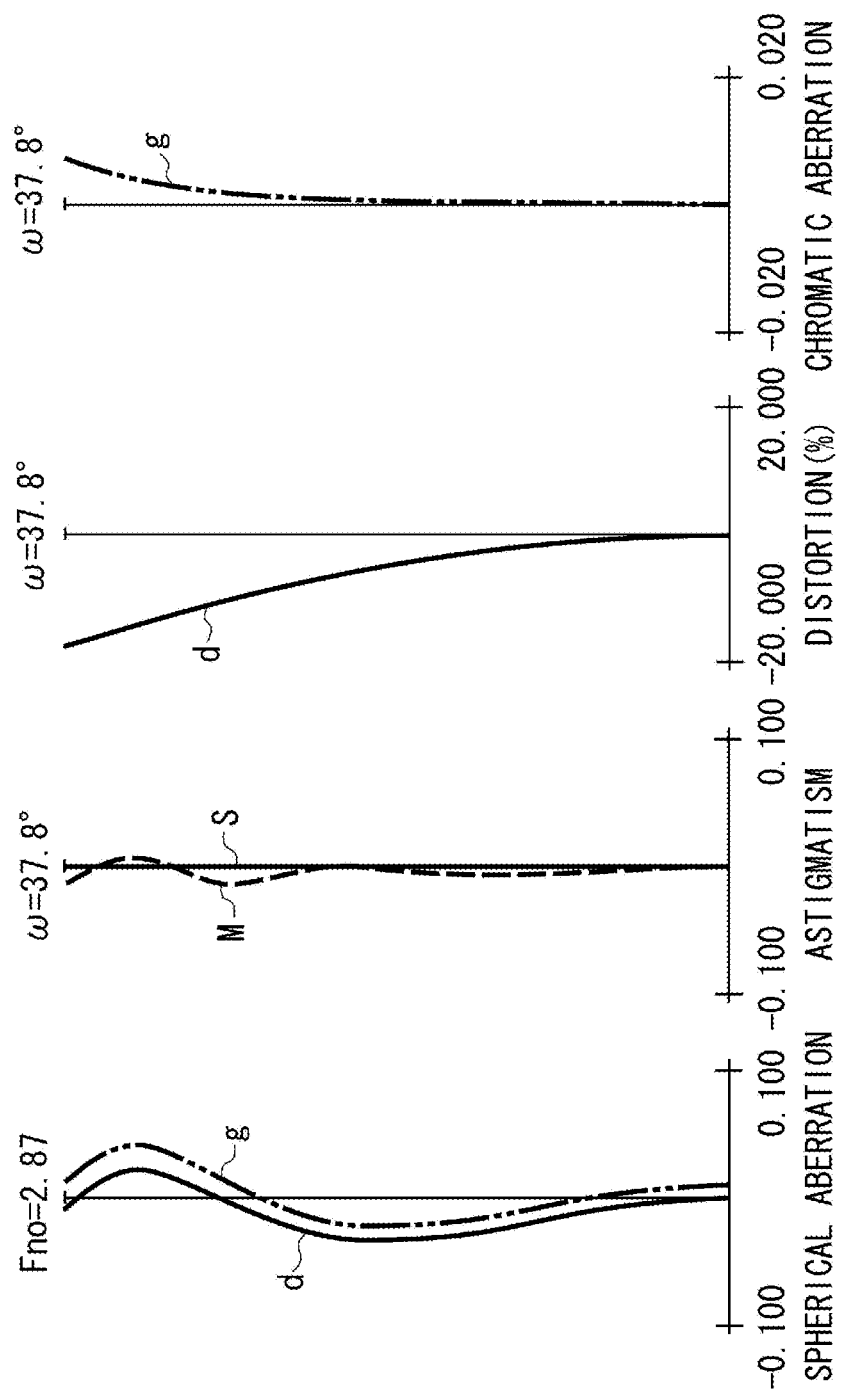
FIGS. 14A, 14B and 14C are aberration charts of the zoom lens respectively at the wide-angle end, at a middle focal length, and at the telephoto end, according to the seventh exemplary embodiment of the present invention.
Figure 14B:
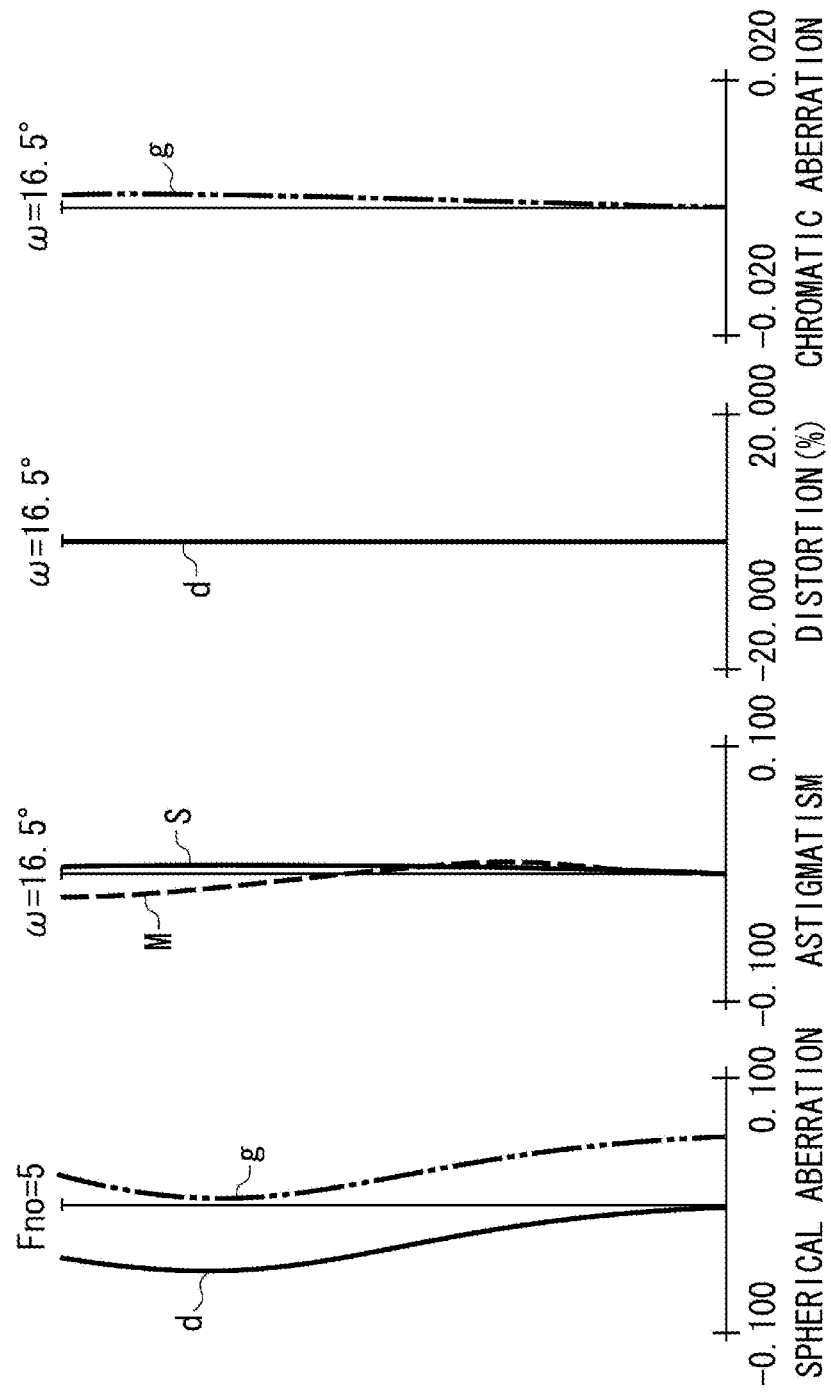
Figure 14C:
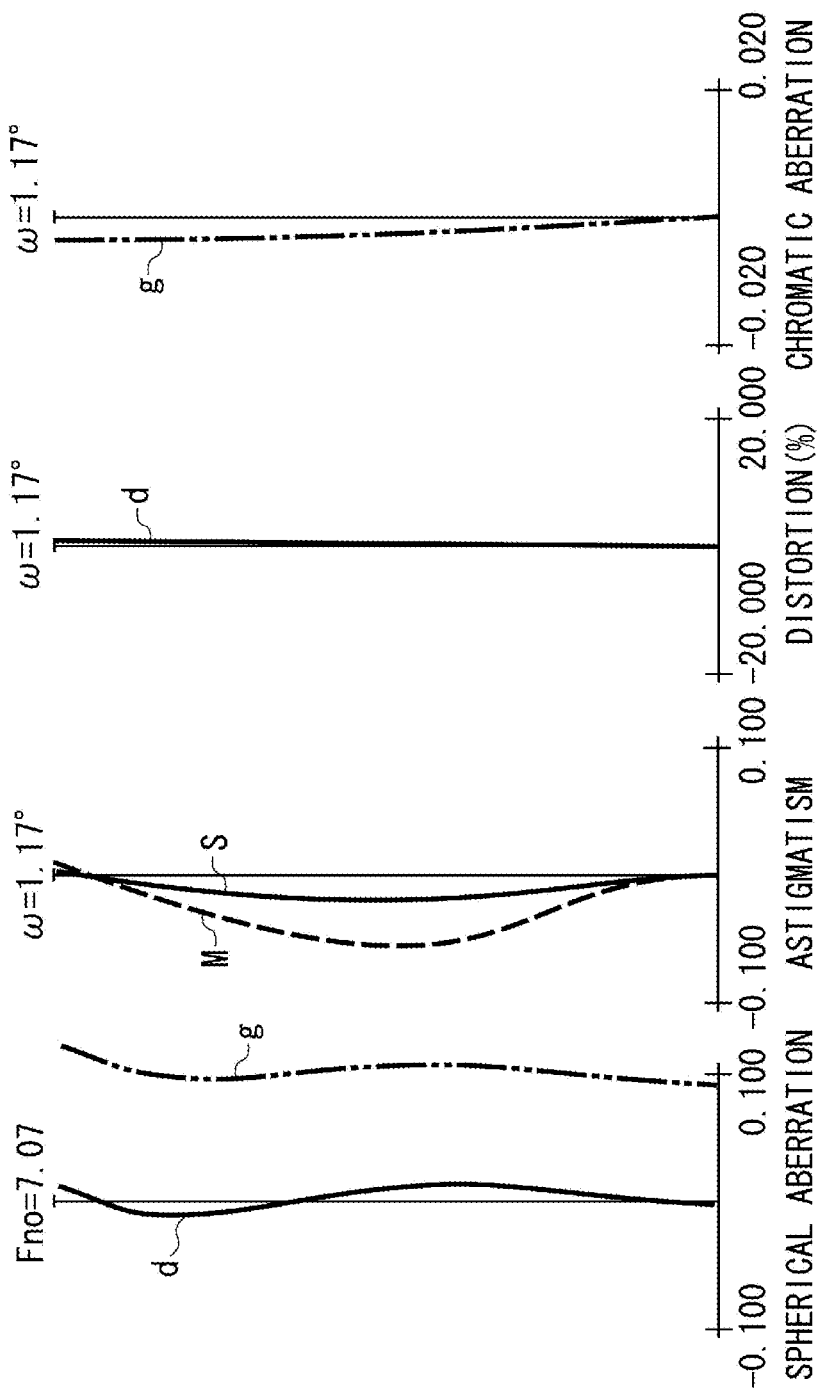

FIG. 13 is a lens cross section of a zoom lens according to a seventh exemplary embodiment of the present invention at the wide-angle end. FIGS. 14A through 14C are aberration charts of the zoom lens according to the seventh exemplary embodiment at the wide-angle end, at a middle focal length, and at the telephoto end. The seventh exemplary embodiment is a zoom lens of a zoom ratio of 44.3 and an aperture ratio of 2.9 to 7.1.

Figure 15:
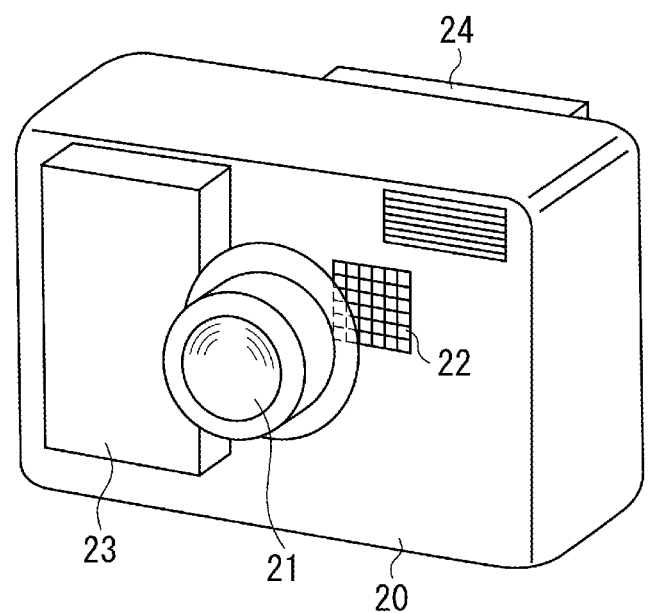
FIG. 15 illustrates exemplary main components of an image pickup apparatus according to an exemplary embodiment of the present invention.

FIG. 15 illustrates exemplary main components of a digital still camera (an image pickup apparatus) equipped with the zoom lens according to an exemplary embodiment of the present invention.

The zoom lens according to each exemplary embodiment is a photographic lens system used in an image pickup apparatus, such as a video camera, a digital still camera, a silver-halide film camera, or a TV camera. The zoom lens according to exemplary embodiment can be used as a projection optical system of a projection apparatus (a projector).

In each of the lens cross sections (FIGS. 1, 3, 5, 7, and 9), the object side (front side) is illustrated in the left-hand portion of the drawing and the image side (rear side) is illustrated in the right-hand portion thereof. Furthermore, in each of the lens cross sections (FIGS. 1, 3, 5, 7, and 9), "i" denotes an order of a lens unit from the object side. "Li" denotes an i-th lens unit. "SP1" denotes an aperture stop. "SP2" denotes a flare cut stop (a mechanical stop). "G" denotes an optical block equivalent to an optical filter, a faceplate, a low-pass filter, or an infrared-ray cut filter.

"IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. The image plane IP is, when the optical system is used as a photographic optical system of a silver-halide film camera, equivalent to a film surface. An arrow indicates a locus of movement of each lens unit during zooming (variable magnification) from the wide-angle end to the telephoto end.

In a portion of each aberration chart (FIGS. 2A through 2C, 4A through 4C, 6A through 6C, 8A through 8C, and 10A through 10C) showing spherical aberration, "Fno" denotes an F-number. The spherical aberration with respect to d-line light (wavelength: 587.6 nm) is illustrated with a solid line. The spherical aberration with respect to g-line light (wavelength: 435.8 nm) is illustrated with an alternate long and two short dashes line.

In a portion of each aberration chart (FIGS. 2A through 2C, 4A through 4C, 6A through 6C, 8A through 8C, and 10A through 10C) showing astigmatism, a solid line S and a dotted line M respectively indicate a sagittal image plane and a meridional image plane with respect to d-line light. Distortion with respect to d-line light is illustrated in each aberration chart. In a portion of each aberration chart (FIGS. 2A through 2C, 4A through 4C, 6A through 6C, 8A through 8C, and 10A through 10C) showing chromatic aberration of magnification, an alternate long and two short dashes line indicates the g-line light. "ω" denotes a half angle of view.

In each of the following exemplary embodiments, each of the wide-angle end and the telephoto end refers to a zooming position when a magnification varying lens unit is positioned at each of the ends of a range in which the magnification varying lens unit can mechanically move along an optical axis.

The zoom lens according to the first to fifth exemplary embodiments includes, in order from the object side to the image side, a first lens unit L1 having a positive refractive power, a second lens unit L2 having a negative refractive power, an aperture stop SP1, a third lens unit L3 having a positive refractive power, a fourth lens unit L4 having a negative refractive power, and a fifth lens unit L5 having a positive refractive power.

During zooming from the wide-angle end to the telephoto end, the first lens unit L1 moves along a locus convex towards the image side. The second lens unit L2 moves along a locus convex towards the image side. The third lens unit L3 moves towards the object side. The fourth lens unit L4 moves towards the object side. The fifth lens unit L5 moves along a locus convex towards the object side. The aperture stop SP1 moves along a locus convex towards the image side. The flare cut stop SP2 moves integrally with the third lens unit L3.

In the zoom lens according to the first to fifth exemplary embodiments, variable magnification is executed primarily by moving the first lens unit L1, the second lens unit L2, and the third lens unit L3. In order to achieve a high zoom ratio while reducing the lens total length at the wide-angle end, the first lens unit L1 is moved to be positioned closer to the object side at the telephoto end than at the wide-angle end. In addition, in the zoom lens according to the first to fifth exemplary embodiments, during zooming from the wide-angle end to the telephoto end, the first lens unit L1 moves along an oscillating or a substantially oscillating moving locus. In other words, the first lens unit L1 is moved towards the image side at first and then is moved towards the object side. Accordingly, the zoom lens according to the first to fifth exemplary embodiments can effectively achieve a short lens total length at a middle focal length.

With the above-described configuration, the first to fifth exemplary embodiments can effectively reduce an effective diameter of the front lens by reducing an effective region of the effective diameter of the front lens, which is fixed in the middle zoom range.

In the zoom lens according to the first to fifth exemplary embodiments, during zooming, the second lens unit L2 moves along a locus convex towards the image side to be positioned at a position closer to the image side at the telephoto end than at the wide-angle end. Accordingly, the second lens unit L2 is provided with a high variable magnification effect.

In addition, during zooming, the third lens unit L3 moves to be positioned at a position closer to the object side at the telephoto end than at the wide-angle end. Accordingly, the third lens unit L3 is provided with a high variable magnification effect. Furthermore, during zooming, the fourth lens unit L4 moves to be positioned at a position closer to the object side at the telephoto end than at the wide-angle end. With the above-described configuration, the first to fifth exemplary embodiments can secure a focusing space for the fifth lens unit L5, which is a focusing lens unit.

The fifth lens unit L5 moves along a locus convex towards the object side during zooming from the wide-angle end to the telephoto end. Moreover, the first to fifth exemplary embodiments employ a rear focusing method, in which focusing is executed by moving the fifth lens unit L5 along the optical axis.

The aperture stop SP1, which is located between the second lens unit L2 and the third lens unit L3, is moved during zooming along a locus different from the moving locus of the other lens units. Accordingly, the zoom lens according to the first to fifth exemplary embodiments can effectively reduce the effective diameter of the front lens. In addition, during zooming from the wide-angle end to the telephoto end, the aperture stop SP1 moves along a locus convex towards the image side. Accordingly, the first to fifth exemplary embodiments can effectively achieve a wide-angle end by easily reducing the effective diameter of the front lens.

The flare cut stop SP2, which has a constant aperture diameter, moves integrally with the third lens unit L3 during zooming. The flare cut stop SP2 effectively shields the upper light flare of the off-axis ray during zooming.

During zooming, the fifth lens unit L5 moves along a locus convex towards the object side. Accordingly, the zoom lens according to the first to fifth exemplary embodiments can effectively utilize the space formed between the fourth lens unit L4 and the fifth lens unit L5. With this configuration, the first to fifth exemplary embodiments can effectively reduce the lens total length.

The fifth lens unit L5 moves along a locus indicated with a solid curve 5a and a dotted curve 5b, which are loci for correcting the variation on the image plane that may occur during variable magnification when focusing on an infinitely-distant object and a closest-distance object, respectively. Focusing from an infinitely-distant object to a closest-distance object at the telephoto end is executed by moving the fifth lens unit L5 forward (towards the object side) as indicated with an arrow 5c.

The zoom lens according to the sixth exemplary embodiment includes, in order from the object side to the image side, a first lens unit L1 having a positive refractive power, a second lens unit L2 having a negative refractive power, an aperture stop SP1, a third lens unit L3 having a positive refractive power, a fourth lens unit L4 having a positive refractive power, and a fifth lens unit L5 having a positive refractive power.

During zooming from the wide-angle end to the telephoto end, the first lens unit L1 moves along a locus convex towards the image side. The second lens unit L2 moves along a locus convex towards the image side. The third lens unit L3 moves towards the object side. The fourth lens unit L4 moves towards the object side. The fifth lens unit L5 moves along a locus convex towards the object side. The aperture stop SP1 moves along a locus convex towards the image side. The flare cut stop SP2 moves integrally with the third lens unit L3.

In the zoom lens according to the sixth exemplary embodiment, variable magnification is executed primarily by moving the first lens unit L1, the second lens unit L2, and the third lens unit L3. In order to achieve a high zoom ratio while reducing the lens total length at the wide-angle end, the first lens unit L1 is moved to be positioned closer to the object side at the telephoto end than at the wide-angle end. In addition, during zooming from the wide-angle end to the telephoto end, the first lens unit L1 moves along an oscillating or a substantially oscillating moving locus. In other words, the first lens unit L1 is moved towards the image side at first and then is moved towards the object side. Accordingly, the zoom lens according to the sixth exemplary embodiment can effectively achieve a short lens total length at a middle focal length.

With the above-described configuration, the sixth exemplary embodiment can effectively reduce an effective diameter of the front lens by reducing an effective region of the effective diameter of the front lens, which is fixed in the middle zoom range.

In the zoom lens according to the sixth exemplary embodiment, during zooming, the second lens unit L2 moves along a locus convex towards the image side to be positioned at a position closer to the image side at the telephoto end than at the wide-angle end. Accordingly, the second lens unit L2 is provided with a high variable magnification effect.

In addition, during zooming, the third lens unit L3 moves to be positioned at a position closer to the object side at the telephoto end than at the wide-angle end. Accordingly, the third lens unit L3 is provided with a high variable magnification effect. Furthermore, during zooming, the fourth lens unit L4 moves to be positioned at a position closer to the object side at the telephoto end than at the wide-angle end. With the above-described configuration, the sixth exemplary embodiment can secure a focusing space for the fifth lens unit L5, which is a focusing lens unit.

The fifth lens unit L5 moves along a locus convex towards the object side during zooming from the wide-angle end to the telephoto end. Moreover, the sixth exemplary embodiment employs a rear focusing method, in which focusing is executed by moving the fifth lens unit L5 along the optical axis.

The aperture stop SP1, which is located between the second lens unit L2 and the third lens unit L3, is moved during zooming along a locus different from the moving locus of the other lens units. Accordingly, the zoom lens according to the sixth exemplary embodiment can effectively reduce the effective diameter of the front lens. In addition, during zooming from the wide-angle end to the telephoto end, the aperture stop SP1 moves along a locus convex towards the image side. Accordingly, the sixth exemplary embodiment can effectively achieve a wide-angle end by easily reducing the effective diameter of the front lens.

The flare cut stop SP2, which has a constant aperture diameter, moves integrally with the third lens unit L3 during zooming. The flare cut stop SP2 effectively shields the upper light flare of the off-axis ray during zooming.

During zooming, the fifth lens unit L5 moves along a locus convex towards the object side. Accordingly, the zoom lens according to the sixth exemplary embodiment can effectively utilize the space formed between the fourth lens unit L4 and the fifth lens unit L5. With this configuration, the sixth exemplary embodiment can effectively reduce the lens total length.

The fifth lens unit L5 moves along a locus indicated with a solid curve 5a and a dotted curve 5b, which are loci for correcting the variation on the image plane that may occur during variable magnification when focusing on an infinitely-distant object and a closest-distance object, respectively. Focusing from an infinitely-distant object to a closest-distance object at the telephoto end is executed by moving the fifth lens unit L5 forward (towards the object side) as indicated with an arrow 5c.

The zoom lens according to the seventh exemplary embodiment includes, in order from the object side to the image side, a first lens unit L1 having a positive refractive power, a second lens unit L2 having a negative refractive power, an aperture stop SP1, a third lens unit L3 having a positive refractive power, and a fourth lens unit L4 having a positive refractive power.

During zooming from the wide-angle end to the telephoto end, the first lens unit L1 moves along a locus convex towards the image side. The second lens unit L2 moves along a locus convex towards the image side. The third lens unit L3 moves towards the object side. The fourth lens unit L4 moves along a locus convex towards the object side. The aperture stop SP1 moves along a locus convex towards the image side. The flare cut stop SP2 moves integrally with the third lens unit L3.

In the zoom lens according to the seventh exemplary embodiment, variable magnification is executed primarily by moving the first lens unit L1, the second lens unit L2, and the third lens unit L3. In order to achieve a high zoom ratio while reducing the lens total length at the wide-angle end, the first lens unit L1 is moved to be positioned closer to the object side at the telephoto end than at the wide-angle end. In addition, during zooming from the wide-angle end to the telephoto end, the first lens unit L1 moves along an oscillating or a substantially oscillating moving locus. In other words, the first lens unit L1 is moved towards the image side at first and then is moved towards the object side. Accordingly, the zoom lens according to the seventh exemplary embodiment can effectively achieve a short lens total length at a middle focal length.

With the above-described configuration, the seventh exemplary embodiment can effectively reduce an effective diameter of the front lens by reducing an effective region of the effective diameter of the front lens, which is fixed in the middle zoom range.

In the zoom lens according to the seventh exemplary embodiment, during zooming, the second lens unit L2 moves along a locus convex towards the image side to be positioned at a position closer to the image side at the telephoto end than at the wide-angle end. Accordingly, the second lens unit L2 is provided with a high variable magnification effect.

In addition, during zooming, the third lens unit L3 moves to be positioned at a position closer to the object side at the telephoto end than at the wide-angle end. Accordingly, the third lens unit L3 is provided with a high variable magnification effect. Furthermore, during zooming from the wide-angle end to the telephoto end, the fourth lens unit L4 moves along a locus convex towards the object side. With the above-described configuration, the seventh exemplary embodiment employs a rear focusing method, in which focusing is executed by moving the fourth lens unit L4 along the optical axis.

The aperture stop SP1, which is located between the second lens unit L2 and the third lens unit L3, is moved during zooming along a locus different from the moving locus of the other lens units. Accordingly, the zoom lens according to the seventh exemplary embodiment can effectively reduce the effective diameter of the front lens. In addition, during zooming from the wide-angle end to the telephoto end, the aperture stop SP1 moves along a locus convex towards the image side. Accordingly, the seventh exemplary embodiment can effectively achieve a wide-angle end by easily reducing the effective diameter of the front lens.

The flare cut stop SP2, which has a constant aperture diameter, moves integrally with the third lens unit L3 during zooming. The flare cut stop SP2 effectively shields the upper light flare of the off-axis ray during zooming.

The fourth lens unit L4 moves along a locus indicated with a solid curve 4a and a dotted curve 4b, which are loci for correcting the variation on the image plane that may occur during variable magnification when focusing on an infinitely-distant object and a closest-distance object, respectively. Focusing from an infinitely-distant object to a closest-distance object at the telephoto end is executed by moving the fourth lens unit L4 forward (towards the object side) as indicated with an arrow 4c.

In each exemplary embodiment, the first lens unit L1 consists of three lenses. More specifically, the first lens unit L1 consists of, in order from the object side to the image side, a negative lens G11, a positive lens G12, and a positive lens G13. In addition, when θgF is a relative partial dispersion of a material of a positive lens included in the first lens unit L1 and vd is an Abbe number of the material of the positive lens included in the first lens unit L1, the following conditions are satisfied:

$$55.0 < vd < 100.0 \quad (1)$$

$$0.52 < \theta gF < 0.59 \quad (2)$$

$$\theta gF + 0.00163 \times vd > 0.65 \quad (3).$$

Values of the Abbe number and the relative partial dispersion θgF can be expressed as follows when nD, ng, nF, and nC are refractive indexes of Fraunhofer line with respect to d-line light, g-line light, F-line light, and C-line light, respectively:

$$vd = (nD-1)/(nF-nC)$$

$$\theta gF = (ng-nF)/(nF-nC).$$

The following fact about an optical material is generally known. More specifically, suppose that the relative partial dispersion θgF of an optical material is mapped on a "θgF–vd" graph, in which the relative partial dispersion θgF is taken on the vertical axis, on which the value becomes greater upwards, and the Abbe number vd is taken on the horizontal axis, on which the value becomes greater leftwards. In this case, the values maybe distributed along a normal line, which is a straight line.

For some materials, the relationship between the relative partial dispersion θgF and the Abbe number vd may exist in a region different from the region of the distribution of the relative partial dispersion θgF and Abbe number vd of normal glass. More specifically, fluorite has a high Abbe number, which is as high as to exist in a region far away from the normal line in the θgF–vd graph.

In the zoom lens (positive-lead type zoom lens) according to each exemplary embodiment, the material having the above-described characteristic is used as a material of the positive lens included in the first lens unit L1. Accordingly, each exemplary embodiment can effectively reduce axial chromatic aberration occurring at the telephoto end, effectively correct aberrations, and effectively reduce the size of the entire zoom lens.

In general, in a positive-lead type zoom lens having a long focal length, the axial ray passes through the first lens unit L1 at a high vertical position. Accordingly, the secondary spectrum of the axial chromatic aberration may easily occur. In order to correct the secondary spectrum of axial chromatic aberration occurring in the first lens unit L1, it is necessary to reduce the slope of a straight line between the characteristics of the materials of the positive lens and the negative lens constituting the first lens unit L1 in the θgF–vd graph.

If a material whose Abbe number is high and having a characteristic far away from the normal line of the θgF–vd graph, such as fluorite, is used, the slope of the characteristics of the positive lens and the negative lens included in the first lens unit L1 may become far less intense than the slope of the normal line. As a result, the secondary spectrum of axial chromatic aberration can be corrected. However, it is difficult to achieve a high optical performance for the entire zoom range by merely using the above-described material for the zoom lens.

In order to effectively achieve a high zoom ratio and reduce the total size of the lens system by using the material whose characteristics are far away from the normal line in the θgF–vd graph, each exemplary embodiment appropriately sets a zoom type, a refractive power of each lens unit, a refractive power of the lens included in the first lens unit, and a lens configuration.

As described above, each exemplary embodiment appropriately uses the material having the characteristics far away from the normal line in the θgF–vd graph and satisfying the conditions (1) through (3). Accordingly, each exemplary embodiment can effectively correct the secondary spectrum of axial chromatic aberration and achieve a zoom lens having a wide angle of view, a high zoom ratio, and a high optical performance for the entire zoom range.

If the Abbe number of the material of the positive lens exceeds the lower limit value of the condition (1), it becomes necessary to increase a curvature of a surface of the lens included in the first lens unit L1 to correct chromatic aberration. If the curvature of the lens surface is increased, the edge of the lens may become small. Accordingly, considering conditions of processing the lens, it becomes necessary to increase the lens thickness. If the lens thickness is increased, in a lens system having a wide angle of view, the effective diameter of the front lens may increase.

On the other hand, if the Abbe number of the material of the positive lens exceeds the upper limit value of the condition (1), the curvature of the lens surface may become low. Accordingly, it becomes easy to reduce the total size of the zoom lens. However, in this case, only a few types of materials described above may exist.

The first lens unit L1, which has a positive refractive power, is very significant in correcting aberrations in the positive-lead type zoom lens. An aberration occurring in the first lens unit L1 is expanded by an amount equivalent to a horizontal magnification ratio of the lens unit from the first lens unit L1 to the image plane. Accordingly, it is necessary to suppress the aberration occurring in the first lens unit L1 to an amount as small as possible.

In reducing axial chromatic aberration occurring when the zoom ratio is increased, as the slope of the straight line between the negative lens and the positive lens included in the first lens unit L1 in the θgF–vd graph becomes less intense, it becomes easier to correct the sheet P of the axial chromatic aberration.

If the relative partial dispersion θgF becomes small exceeding the lower limit value of the condition (2), it becomes impossible to loosen the curve between the characteristics of the negative lens and the positive lens in the θgF–vd graph. Accordingly, a large amount of the secondary spectrum of axial chromatic aberration may arise. As a result, it becomes difficult to implement a high optical performance and a high zoom ratio at the same time.

On the other hand, if the relative partial dispersion θgF becomes great exceeding the upper limit value of the condition (2), it becomes easy to loosen the curve between the negative lens and the positive lens in the θgF–vd graph. However, if actually existing glass is used as the material, the glass may have a highly dispersed Abbe number. Accordingly, in this case, it becomes difficult to correct axial chromatic aberration occurring in the first lens unit L1.

The condition (3) provides a condition for a range of the straight line having the same slope as the slope of the normal line in the θgF–vd graph. If the value of the left-hand side (i.e., "θgF+0.00163×vd") of the condition (3) becomes small exceeding the lower limit value thereof, the anomalous dispersion may decrease. As a result, it becomes difficult to correct the secondary spectrum of axial chromatic aberration.

By satisfying the above-described conditions (1) through (3), each exemplary embodiment can effectively achieve a zoom lens having a wide angle of view and a high zoom ratio, whose total size is small, and capable of capturing a high quality image.

In each exemplary embodiment, it is further useful if at least one of the following conditions are satisfied to more effectively achieve the effect of each condition.

When fW is a focal length of the entire zoom lens at the wide-angle end, f1 is a focal length of the first lens unit L1, fG2 is a focal length of the positive lens G12, which is the positive lens included in the first lens unit L1 located closest to the object side, fG3 is a focal length of the positive lens G13, which is the positive lens included in the first lens unit L1 located closest to the image side, and nd is an average refractive index of materials of the positive lenses included in the first lens unit L1, at least one of the following conditions is satisfied:

$$18.0 < f1/fW < 30.0 \quad (4)$$

$$15.0 < fG2/fW < 25.0 \quad (5)$$

$$24.0 < fG3/fW < 45.0 \quad (6)$$

$$nd > 1.54 \quad (7).$$

The condition (4) provides a condition for the focal length of the first lens unit L1. If the focal length f1 becomes small exceeding the lower limit value of the condition (4), the power (=an inverse of the focal length) of the first lens unit L1 may become extremely intense. As a result, it becomes difficult to correct spherical aberration at the telephoto end.

In order to correct spherical aberration at the telephoto end, it is necessary to increase the number of lenses included in the first lens unit L1. However, if the number of lenses is increased, the effective diameter of the first lens unit L1 may become large.

On the other hand, if the focal length f1 becomes great exceeding the upper limit value of the condition (4), the power of the first lens unit L1 becomes small. In this case, it becomes easy to correct spherical aberration. However, the power may become too small. As a result, it becomes difficult to achieve a wide angle of view.

The condition (5) provides a condition for the power assigned to the positive lens G12 included in the first lens unit L1, which is located closest to the object side. If the focal length fG2 becomes small exceeding the lower limit value of the condition (5), the power of the positive lens G12 may become extremely intense. Accordingly, it becomes difficult to correct axial chromatic aberration at the telephoto end. In addition, it becomes difficult to correct chromatic aberration of magnification in the range from the wide-angle end to the telephoto end. Furthermore, the curvature of the lens surface of the first lens (negative lens) G11 may become intense. As a result, it becomes difficult to secure an appropriate dimension of the edge (i.e., the thickness) of the lens. Moreover, the effective diameter of the first lens unit L1 may become large. Accordingly, in this case, it becomes difficult to achieve a zoom lens whose total size is small.

On the other hand, if the power of the positive lens G12 becomes small exceeding the upper limit value of the condition (5), the thickness of the lens can be easily reduced. However, the effect of correcting chromatic aberration by the positive lens G12 may become small. As a result, it becomes difficult to correct chromatic aberration of magnification and axial chromatic aberration.

The condition (6) provides a condition for the power of the positive lens G13, which is included in the first lens unit L1 and located closest to the image side. The positive lens G13 is assigned with the power well balanced with the power of the positive lens G12 and great enough to effectively correct spherical aberration at the telephoto end. In addition, the positive lens G13 is assigned with the power to effectively correct off-axis aberration in the range from the wide-angle end to the telephoto end.

If the focal length fG3 becomes small exceeding the lower limit value of the condition (6), the power of the positive lens G13 may become extremely intense. Accordingly, the spherical aberration may become undercorrected at the telephoto end. As a result, it becomes difficult to correct spherical aberration.

On the other hand, if the focal length fG3 becomes great exceeding the upper limit value of the condition (6), the power of the positive lens G13 may become extremely small. As a result, spherical aberration may become overcorrected. Accordingly, it becomes difficult to correct spherical aberration.

In addition, in this case, it becomes necessary to assign a very great power to the positive lens G12. Accordingly, the power of the positive lens G12 becomes very intense and the curvature of the lens surface may become high. Furthermore, due to a processing restriction in this case, the effective diameter of the front lens may become great. As a result, it becomes difficult to achieve a zoom lens whose total size is small.

The condition (7) provides a condition for the refractive index of the materials of the positive lenses included in the first lens unit L1. If the refractive index of the materials of the positive lenses becomes small exceeding the lower limit value of the condition (7), the curvature of the lens surface of the positive lens becomes very high. Accordingly, the amount of spherical aberration may increase at the telephoto end. Furthermore, in this case, it becomes necessary to increase the number of positive lenses to correct spherical aberration. As a result, it becomes difficult to reduce the total size of the zoom lens.

In each exemplary embodiment, the range of the values in the conditions (1) through (7) can be altered as follows:

$$60.0 < vd < 90.0 \quad (1a)$$

$$0.53 < \theta gF < 0.58 \quad (2a)$$

$$\theta gF + 0.00163 \times vd > 0.653 \quad (3a)$$

$$18.1 < f1/fW < 29.0 \quad (4a)$$

$$15.5 < fG2/fW < 24.5 \quad (5a)$$

$$24.5 < fG3/fW < 44.5 \quad (6a)$$

$$nd > 1.542 \quad (7a).$$

In each exemplary embodiment, in order to implement the effect of each condition described above at the most, the range of the values in the conditions (1a) through (7a) can be altered as follows:

$$65.0 < vd < 85.0 \quad (1b)$$

$$0.535 < \theta gF < 0.570 \quad (2b)$$

$$\theta gF + 0.00163 \times vd > 0.655 \quad (3b)$$

$$18.2 < f1/fW < 27.0 \quad (4b)$$

$$16.0 < fG2/fW < 24.0 \quad (5b)$$

$$25.0 < fG3/fW < 44.0 \quad (6b)$$

$$nd > 1.544 \quad (7b).$$

In each exemplary embodiment, the first lens unit L1 consists of three lenses. If the lens system has a wide angle of view, it becomes easier to reduce the total size of the zoom lens as the number of lenses constituting the first lens unit L1 becomes smaller.

On the other hand, in order to achieve a high zoom ratio, if the number of lenses constituting the first lens unit L1 is small, it becomes difficult to correct spherical aberration. Accordingly, in order to achieve a wide-angle end and a high zoom ratio at the same time, the first lens unit L1 can consist of three lenses. In particular, the first lens unit L1 can consist of three lenses, i.e., the negative lens G11, the positive lens G12, and the positive lens G13, which are located in order from the object side to the image side. The negative lens G11 and the positive lens G12 can be cemented together or used as separate lenses.

The second lens unit L2 can include, in order from the object side to the image side, a negative lens, a negative lens, and a positive lens. By using the second lens unit L2, which is configured to move during zooming and having the above-described lens configuration, the variation of chromatic aberration of magnification, which may occur during zooming, can be easily suppressed.

The third lens unit L3, which is located subsequent to the second lens unit L2, has a positive refractive power. At the wide-angle end, an axial light flux becomes a diverging light flux by passing through the second lens unit L2, which has a negative refractive power.

By assigning a positive refractive power to the positive lens G13, which is a rear lens unit provided subsequent to the second lens unit L2 and located closest to the object side, the positive lens G13 can effectively cause the light flux to converge. Accordingly, the effective diameter of the lens of the rear lens unit can be reduced. The third lens unit L3 includes, in order from the object side to the image side, a positive lens, a negative lens, and a cemented lens constituted by a negative lens and a positive lens.

In the triplet lens configuration including the positive lens, the negative lens, and the positive lens, the positive lens located closest to the image side is a Tessar type lens, which is a cemented lens constituted by a negative lens and a positive lens. With this configuration, the Petzval sum is finely adjusted. With the above-described configuration, each exemplary embodiment can effectively achieve a high evenness of the image plane for the entire zoom range.

In the first to fifth exemplary embodiments, the fourth lens unit L4 includes one negative lens. In other words, the fourth lens unit L4 is assigned with a negative power. With this configuration, the effective diameter of the first lens unit L1 can be effectively reduced. As a result, the first to fifth exemplary embodiments can easily reduce the total size of the zoom lens.

By using the fourth lens unit L4 assigned with a negative power, the positional sensitivity of the fifth lens unit L5 becomes high. Accordingly, the first to fifth exemplary embodiments can reduce the amount of movement of the fifth lens unit L5 for focusing. With the above-described configuration, the first to fifth exemplary embodiments can reduce the space for the fifth lens unit (focusing lens unit) L5 in the direction of the optical axis. As a result, each exemplary embodiment can easily reduce the total size of the zoom lens.

In the sixth exemplary embodiment, the fourth lens unit L4 is composed of a single positive lens. Since the fourth lens unit L4 is provided with a positive refractive power, the positive refractive power can be shared by the third lens unit L3 and the fourth lens unit L4. Accordingly, moving the fourth lens unit L4 along a locus different from that of the third lens unit L3 facilitates correcting aberration well over the entire zoom range.

The fourth lens unit L4 of the seventh exemplary embodiment and the fifth lens unit L5 of the first to sixth exemplary embodiments include a cemented lens constituted by a positive lens and a negative lens. By using the cemented lens for the fourth lens unit L4 or the fifth lens unit L5, each exemplary embodiment can effectively suppress the variation of chromatic aberration of magnification in the entire zoom range.

In addition, a lens having an aspheric surface can be used as the lens of the third lens unit L3 or the second lens unit L2. By appropriately setting the refractive power of the third lens unit L3 and the second lens unit L2, it becomes easy to correct off-axis aberration, particularly astigmatism, distortion, and spherical aberration and coma that may occur when the angle of view the zoom ratio are increased.

By setting each element as described above, each exemplary embodiment can achieve a zoom lens, which is useful for an image pickup apparatus that uses a solid-state image sensor, which has a variable magnification ratio of 33.0 to 45.0, and which has a high zoom ratio and a high optical performance.

Numerical examples 1 through 7, which respectively correspond to the first through the seventh exemplary embodiments of the present invention, are set forth below. In each of the numerical examples 1 through 7, "i" denotes the order of a surface from the object side, "ri" denotes a radius of curvature of an i-th optical surface (an i-th lens surface), "di" denotes an axial distance between the i-th surface and the (i+1)-th surface, "ndi" and "vdi" respectively denote a refractive index and an Abbe number of the material of the i-th optical member with respect to d-line light.

In addition, two surfaces from the image side are equivalent to the glass block G. Each of "A4", "A6", "A8", and "A10" denotes an aspheric coefficient for each corresponding order. The aspheric shape is expressed as $$X=(H^2/R)/[1+\sqrt{1-(1+K)(H/R)^2}]+A4H^4+A6H^6+A8H^8+A10H^{10}$$

where the aspheric shape has a positive value in the direction of travel of light, "X" denotes a displacement from a surface vertex along the optical axis in a position at a height "H" from the optical axis, "R" denotes a paraxial radius of curvature, and "K" denotes a conic constant. Furthermore, aspherical surfaces are marked with an asterisk (*) on the side of the surface number. The scientific notation "e-x" for each aspheric coefficient is equivalent to the exponential notation "$10^{-x}$". "BF" denotes an air-equivalent back focus. The relationship between each condition described above and each numerical example is set forth in Table 1.

NUMERICAL EXAMPLE 1

| Unit: mm | | | | |
|---|---|---|---|---|
| Surface Data | | | | |
| Surface No. | r | d | nd | vd |
| 1 | 145.336 | 1.20 | 1.80610 | 33.3 |
| 2 | 56.017 | 6.40 | 1.59282 | 68.6 |
| 3 | −363.559 | 0.18 | | |

-continued

Unit: mm

| | | | | |
|---|---|---|---|---|
| 4 | 47.435 | 3.10 | 1.59282 | 68.6 |
| 5 | 108.741 | Variable | | |
| 6* | 135.649 | 0.70 | 1.88300 | 40.8 |
| 7* | 8.307 | 6.08 | | |
| 8 | −32.885 | 0.70 | 1.77250 | 49.6 |
| 9 | 27.488 | 0.20 | | |
| 10 | 18.026 | 1.90 | 1.92286 | 18.9 |
| 11 | 121.040 | Variable | | |
| 12 (Stop) | ∞ | Variable | | |
| 13* | 9.867 | 3.90 | 1.55332 | 71.7 |
| 14* | −61.033 | 1.04 | | |
| 15 | 45.528 | 0.60 | 1.64769 | 33.8 |
| 16 | 10.040 | 0.34 | | |
| 17 | 13.322 | 0.70 | 1.80400 | 46.6 |
| 18 | 8.552 | 2.55 | 1.48749 | 70.2 |
| 19 | −25.961 | 0.30 | | |
| 20 | ∞ | Variable | | |
| 21 | 49.500 | 0.70 | 1.48749 | 70.2 |
| 22 | 16.154 | Variable | | |
| 23 | 18.820 | 2.65 | 1.78590 | 44.2 |
| 24 | −31.873 | 0.60 | 1.94595 | 18.0 |
| 25 | −356.488 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R6 | K = 3.68160e+001 | A4 = 1.51224e−005 |
| | A6 = −1.40667e−008 | A8 = −3.11437e−012 |
| R7 | K = 2.80854e−003 | A4 = −5.61496e−007 |
| | A6 = −3.71099e−007 | A8 = 3.93714e−010 |
| R13 | K = −3.08184e−001 | A4 = −6.13413e−005 |
| | A6 = −1.82144e−007 | A8 = −8.15076e−009 |
| | A10 = 2.62605e−010 | |
| R14 | K = 1.99608e−001 | A4 = 3.91461e−005 |
| | A6 = −1.66528e−007 | |

Various Data
Zoom Ratio 40.71

| | Wide-Angle End | Middle Focal Length | Telephoto End |
|---|---|---|---|
| Focal Lengths | 3.61 | 12.74 | 147.00 |
| F-number | 2.44 | 3.73 | 5.88 |
| Angle of View | 42.03 | 16.92 | 1.51 |
| Image Height | 3.25 | 3.88 | 3.88 |
| Lens Total Length | 92.38 | 92.55 | 154.15 |
| BF | 1.00 | 1.00 | 1.00 |
| d5 | 0.50 | 18.88 | 72.12 |
| d11 | 28.10 | 10.78 | 0.99 |
| d12 | 14.64 | 1.53 | 2.04 |
| d20 | 1.79 | 5.13 | 18.00 |
| d22 | 3.94 | 5.39 | 17.68 |
| d25 | 7.77 | 15.20 | 7.68 |
| d27 | 1.00 | 1.00 | 1.00 |

NUMERICAL EXAMPLE 2

Unit: mm

Surface Data

| Surface No. | r | d | nd | vd |
|---|---|---|---|---|
| 1 | 147.304 | 1.80 | 1.80610 | 33.3 |
| 2 | 52.108 | 5.30 | 1.59282 | 68.6 |

-continued

Unit: mm

| | | | | |
|---|---|---|---|---|
| 3 | −215.707 | 0.18 | | |
| 4 | 44.709 | 3.10 | 1.59282 | 68.6 |
| 5 | 115.574 | Variable | | |
| 6 | 89.111 | 0.95 | 1.88300 | 40.8 |
| 7 | 8.544 | 5.12 | | |
| 8 | −32.776 | 0.70 | 1.77250 | 49.6 |
| 9 | 28.398 | 0.20 | | |
| 10 | 17.196 | 2.25 | 1.92286 | 18.9 |
| 11 | 91.138 | Variable | | |
| 12 (Stop) | ∞ | Variable | | |
| 13* | 10.074 | 3.90 | 1.55332 | 71.7 |
| 14* | −71.474 | 1.87 | | |
| 15 | 40.481 | 0.60 | 1.64769 | 33.8 |
| 16 | 10.237 | 0.35 | | |
| 17 | 14.146 | 0.70 | 1.80400 | 46.6 |
| 18 | 8.475 | 2.60 | 1.48749 | 70.2 |
| 19 | −32.106 | 0.30 | | |
| 20 | ∞ | Variable | | |
| 21 | 181.494 | 0.70 | 1.48749 | 70.2 |
| 22 | 24.300 | Variable | | |
| 23 | 20.273 | 2.25 | 1.78590 | 44.2 |
| 24 | −51.774 | 0.60 | 1.94595 | 18.0 |
| 25 | 842.457 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R13 | K = −3.42058e−001 | A4 = −4.56885e−005 |
| | A6 = 2.04023e−007 | A8 = −1.49763e−008 |
| | A10 = 2.62605e−010 | |
| R14 | K = 9.47855e+000 | A4 = 3.97434e−005 |
| | A6 = 2.28187e−008 | |

Various Data
Zoom Ratio 33.56

| | Wide-Angle End | Middle Focal Length | Telephoto End |
|---|---|---|---|
| Focal Lengths | 4.42 | 13.77 | 148.34 |
| F-number | 2.71 | 4.05 | 5.82 |
| Angle of View | 37.01 | 15.71 | 1.50 |
| Image Height | 3.33 | 3.88 | 3.88 |
| Lens Total Length | 96.02 | 95.34 | 138.50 |
| BF | 1.00 | 1.00 | 1.00 |
| d5 | 0.78 | 17.89 | 60.65 |
| d11 | 32.21 | 14.05 | 2.47 |
| d12 | 12.78 | 3.10 | 2.00 |
| d20 | 2.48 | 6.43 | 9.48 |
| d22 | 3.86 | 3.67 | 20.38 |
| d25 | 8.64 | 14.94 | 8.24 |
| d27 | 1.00 | 1.00 | 1.00 |

NUMERICAL EXAMPLE 3

Unit: mm

Surface Data

| Surface No. | r | d | nd | vd |
|---|---|---|---|---|
| 1 | 116.595 | 1.80 | 1.80610 | 33.3 |
| 2 | 52.830 | 5.00 | 1.49700 | 81.5 |
| 3 | −201.540 | 0.18 | | |
| 4 | 44.471 | 3.30 | 1.59282 | 68.6 |

-continued

Unit: mm

| | | | | |
|---|---|---|---|---|
| 5 | 130.101 | Variable | | |
| 6 | 179.056 | 0.95 | 1.88300 | 40.8 |
| 7 | 8.781 | 4.84 | | |
| 8 | −35.117 | 0.70 | 1.77250 | 49.6 |
| 9 | 26.663 | 0.20 | | |
| 10 | 17.044 | 2.25 | 1.92286 | 18.9 |
| 11 | 99.023 | Variable | | |
| 12 (Stop) | ∞ | Variable | | |
| 13* | 10.061 | 4.25 | 1.55332 | 71.7 |
| 14* | −71.895 | 1.56 | | |
| 15 | 45.227 | 0.60 | 1.64769 | 33.8 |
| 16 | 10.068 | 0.35 | | |
| 17 | 13.348 | 0.60 | 1.80400 | 46.6 |
| 18 | 8.406 | 2.80 | 1.48749 | 70.2 |
| 19 | −31.663 | 0.30 | | |
| 20 | ∞ | Variable | | |
| 21 | 198.899 | 0.70 | 1.48749 | 70.2 |
| 22 | 25.684 | Variable | | |
| 23 | 20.993 | 2.10 | 1.78590 | 44.2 |
| 24 | −59.586 | 0.60 | 1.94595 | 18.0 |
| 25 | 562.341 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R13 | K = −3.71849e−001 | A4 = −4.03421e−005 |
| | 6 = −3.91189e−008 | A8 = −1.91925e−008 |
| | A10 = 2.62605e−010 | |
| R14 | K = 1.57387e+001 | A4 = 4.09244e−005 |
| | A6 = −5.21539e−007 | |

Various Data
Zoom Ratio 33.48

| | Wide-Angle End | Middle Focal Length | Telephoto End |
|---|---|---|---|
| Focal Lengths | 4.42 | 13.79 | 147.97 |
| F-number | 2.71 | 3.83 | 5.81 |
| Angle of View | 37.01 | 15.69 | 1.50 |
| Image Height | 3.33 | 3.88 | 3.88 |
| Lens Total Length | 95.53 | 94.83 | 138.51 |
| BF | 1.00 | 1.00 | 1.00 |
| d5 | 0.78 | 17.32 | 60.34 |
| d11 | 32.49 | 12.23 | 2.55 |
| d12 | 12.24 | 4.77 | 1.58 |
| d20 | 2.31 | 6.19 | 9.49 |
| d22 | 3.83 | 4.00 | 20.42 |
| d25 | 9.00 | 15.43 | 9.25 |
| d27 | 1.00 | 1.00 | 1.00 |

NUMERICAL EXAMPLE 4

Unit: mm

Surface Data

| Surface No. | r | d | nd | vd |
|---|---|---|---|---|
| 1 | 128.900 | 1.20 | 1.80610 | 33.3 |
| 2 | 55.275 | 6.70 | 1.59282 | 68.6 |
| 3 | −314.783 | 0.18 | | |
| 4 | 48.367 | 3.30 | 1.49700 | 81.5 |
| 5 | 138.468 | Variable | | |
| 6* | 147.547 | 0.70 | 1.88300 | 40.8 |

-continued

Unit: mm

| | | | | |
|---|---|---|---|---|
| 7* | 8.368 | 5.76 | | |
| 8 | −28.770 | 0.70 | 1.77250 | 49.6 |
| 9 | 25.088 | 0.20 | | |
| 10 | 18.269 | 1.85 | 1.92286 | 18.9 |
| 11 | 246.774 | Variable | | |
| 12 (Stop) | ∞ | Variable | | |
| 13* | 9.741 | 3.10 | 1.55332 | 71.7 |
| 14* | −67.675 | 1.51 | | |
| 15 | 46.120 | 0.60 | 1.64769 | 33.8 |
| 16 | 10.994 | 0.25 | | |
| 17 | 14.282 | 0.70 | 1.80400 | 46.6 |
| 18 | 8.321 | 2.50 | 1.48749 | 70.2 |
| 19 | −26.394 | 0.30 | | |
| 20 | ∞ | Variable | | |
| 21 | 42.902 | 0.70 | 1.48749 | 70.2 |
| 22 | 15.115 | Variable | | |
| 23 | 19.837 | 2.50 | 1.78590 | 44.2 |
| 24 | −30.070 | 0.60 | 1.94595 | 18.0 |
| 25 | −228.445 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R6 | K = 1.03108e+002 | A4 = 1.51950e−005 |
| | A6 = −4.06651e−008 | A8 = −9.11050e−011 |
| R7 | K = 5.80956e−002 | A4 = −2.38030e−005 |
| | A6 = 2.87087e−007 | A8 = −5.53044e−009 |
| R13 | K = 5.43264e−002 | A4 = −7.17815e−005 |
| | A6 = −5.61355e−007 | A8 = −3.51757e−009 |
| | A10 = 2.62605e−010 | |
| R14 | K = −3.33931e+001 | A4 = 7.99817e−005 |
| | A6 = 8.51467e−008 | |

Various Data
Zoom Ratio 38.68

| | Wide-Angle End | Middle Focal Length | Telephoto End |
|---|---|---|---|
| Focal Lengths | 3.80 | 10.30 | 147.00 |
| F-number | 2.62 | 4.19 | 5.94 |
| Angle of View | 40.58 | 20.62 | 1.51 |
| Image Height | 3.25 | 3.88 | 3.88 |
| Lens Total Length | 90.76 | 87.72 | 149.92 |
| BF | 1.00 | 1.00 | 1.00 |
| d5 | 0.50 | 11.17 | 69.34 |
| d11 | 28.45 | 14.42 | 0.50 |
| d12 | 12.59 | 1.42 | 1.40 |
| d20 | 2.04 | 3.92 | 15.00 |
| d22 | 3.94 | 7.63 | 15.35 |
| d25 | 8.09 | 14.02 | 13.19 |
| d27 | 1.00 | 1.00 | 1.00 |

NUMERICAL EXAMPLE 5

Unit: mm

Surface Data

| Surface No. | r | d | nd | vd |
|---|---|---|---|---|
| 1 | 125.306 | 1.20 | 1.80610 | 33.3 |
| 2 | 56.209 | 6.30 | 1.59282 | 68.6 |
| 3 | −427.337 | 0.18 | | |
| 4 | 47.706 | 3.10 | 1.49700 | 81.5 |

-continued

Unit: mm

| | | | | |
|---|---|---|---|---|
| 5 | 120.064 | Variable | | |
| 6* | 135.563 | 0.70 | 1.88300 | 40.8 |
| 7* | 8.226 | 6.12 | | |
| 8 | −34.247 | 0.70 | 1.77250 | 49.6 |
| 9 | 27.949 | 0.20 | | |
| 10 | 18.064 | 1.85 | 1.92286 | 18.9 |
| 11 | 117.275 | Variable | | |
| 12 (Stop) | ∞ | Variable | | |
| 13* | 9.830 | 4.35 | 1.55332 | 71.7 |
| 14* | −70.795 | 0.84 | | |
| 15 | 43.219 | 0.60 | 1.64769 | 33.8 |
| 16 | 10.161 | 0.35 | | |
| 17 | 13.563 | 0.70 | 1.80400 | 46.6 |
| 18 | 8.515 | 2.60 | 1.48749 | 70.2 |
| 19 | −24.771 | 0.30 | | |
| 20 | ∞ | Variable | | |
| 21 | 47.530 | 0.70 | 1.48749 | 70.2 |
| 22 | 16.022 | Variable | | |
| 23 | 18.573 | 2.85 | 1.78590 | 44.2 |
| 24 | −29.299 | 0.60 | 1.94595 | 18.0 |
| 25 | −278.431 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R6 | K = 4.56708e+001 | A4 = 1.51738e−005 |
| | A6 = −2.00294e−008 | A8 = 1.72932e−011 |
| R7 | K = −1.89235e−002 | A4 = 1.71666e−007 |
| | A6 = −6.08488e−007 | A8 = 2.01545e−009 |
| R13 | K = −2.66277e−001 | A4 = −6.36120e−005 |
| | A6 = −4.97651e−007 | A8 = −1.24558e−008 |
| | A10 = 2.62605e−010 | |
| R14 | K = −3.63265e+001 | A4 = 3.23736e−005 |
| | A6 = −6.83837e−007 | |

Various Data
Zoom Ratio 40.75

| | Wide-Angle End | Middle Focal Length | Telephoto End |
|---|---|---|---|
| Focal Lengths | 3.61 | 12.75 | 147.01 |
| F-number | 2.39 | 3.75 | 5.90 |
| Angle of View | 42.06 | 16.90 | 1.51 |
| Image Height | 3.25 | 3.88 | 3.88 |
| Lens Total Length | 91.62 | 91.97 | 155.23 |
| BF | 1.00 | 1.00 | 1.00 |
| d5 | 0.50 | 18.90 | 73.36 |
| d11 | 27.58 | 10.37 | 1.00 |
| d12 | 14.47 | 1.37 | 1.55 |
| d20 | 1.80 | 5.23 | 18.00 |
| d22 | 3.52 | 4.97 | 17.14 |
| d25 | 7.71 | 15.10 | 8.15 |
| d27 | 1.00 | 1.00 | 1.00 |

NUMERICAL EXAMPLE 6

Unit: mm

Surface Data

| Surface No. | r | d | nd | vd | Effective diameter |
|---|---|---|---|---|---|
| 1 | 123.178 | 1.00 | 1.80610 | 33.3 | 39.93 |
| 2 | 53.710 | 5.65 | 1.49700 | 81.5 | 36.97 |

-continued

Unit: mm

| | | | | | |
|---|---|---|---|---|---|
| 3 | −151.935 | 0.18 | | | 35.37 |
| 4 | 46.687 | 3.00 | 1.59282 | 68.6 | 33.27 |
| 5 | 136.973 | Variable | | | 32.91 |
| 6* | 224.284 | 0.70 | 1.88300 | 40.8 | 18.21 |
| 7* | 8.432 | 4.48 | | | 13.50 |
| 8 | −34.395 | 0.50 | 1.80400 | 46.6 | 13.28 |
| 9 | 28.199 | 0.20 | | | 13.19 |
| 10 | 16.766 | 2.00 | 1.94595 | 18.0 | 13.45 |
| 11 | 85.065 | Variable | | | 13.23 |
| 12 (Stop) | ∞ | Variable | | | 7.09 |
| 13* | 9.843 | 3.00 | 1.55332 | 71.7 | 9.00 |
| 14* | −71.895 | 2.09 | | | 8.59 |
| 15 | 24.025 | 0.50 | 1.64769 | 33.8 | 7.51 |
| 16 | 11.017 | 0.35 | | | 7.20 |
| 17 | 17.894 | 0.50 | 1.80400 | 46.6 | 7.18 |
| 18 | 7.506 | 2.40 | 1.48749 | 70.2 | 7.10 |
| 19 | −45.320 | 0.30 | | | 7.34 |
| 20 | −512.184 | 0.50 | 1.43875 | 94.9 | 7.42 |
| 21 | 40.427 | 0.50 | | | 7.51 |
| 22 | ∞ | Variable | | | 7.60 |
| 23 | 26.209 | 1.50 | 1.48749 | 70.2 | 8.71 |
| 24 | 34.836 | Variable | | | 8.81 |
| 25 | 28.083 | 2.50 | 1.74950 | 35.3 | 11.61 |
| 26 | −23.563 | 0.50 | 1.94595 | 18.0 | 11.55 |
| 27 | −89.484 | Variable | | | 11.56 |
| 28 | ∞ | 0.80 | 1.51633 | 64.1 | 15.00 |
| 29 | ∞ | Variable | | | 15.00 |
| Image plane | ∞ | | | | |

Aspheric Coefficients

| | | |
|---|---|---|
| R6 | K = −1.05448e+004 | A4 = 1.39626e−005 |
| | A6 = 3.87206e−007 | A8 = −9.23386e−009 |
| | A10 = 3.70772e−011 | A12 = 6.86907e−014 |
| R7 | K = 1.28834e−002 | A4 = −1.05471e−004 |
| | A6 = 3.73155e−006 | A8 = −1.97267e−008 |
| | A10 = −1.10223e−009 | A12 = 6.60991e−012 |
| R13 | K = −6.17378e−001 | A4 = 2.53617e−005 |
| | A6 = −2.27818e−006 | A8 = −1.35745e−008 |
| | A10 = 2.62605e−010 | |
| R14 | K = 1.36688e+002 | A4 = 1.10383e−004 |
| | A6 = −1.99129e−006 | |

Various Data
Zoom Ratio 43.46

| | Wide-Angle End | Middle Focal Length | Telephoto End |
|---|---|---|---|
| Focal Lengths | 4.30 | 12.73 | 187.00 |
| F-number | 2.87 | 5.00 | 7.07 |
| Angle of View | 37.76 | 16.94 | 1.19 |
| Image Height | 3.33 | 3.88 | 3.88 |
| Lens Total Length | 93.83 | 95.36 | 140.56 |
| BF | 1.00 | 1.00 | 1.00 |
| d5 | 0.78 | 16.76 | 62.40 |
| d11 | 32.19 | 12.78 | 0.84 |
| d12 | 12.02 | 5.16 | −0.50 |
| d22 | 1.90 | 6.25 | 3.74 |
| d24 | 3.60 | 2.81 | 25.35 |
| d27 | 9.20 | 17.46 | 14.58 |
| d29 | 1.00 | 1.00 | 1.00 |

NUMERICAL EXAMPLE 7

Unit: mm

Surface Data

| Surface No. | r | d | nd | νd |
|---|---|---|---|---|
| 1 | 121.623 | 1.00 | 1.80610 | 33.3 |
| 2 | 53.428 | 5.65 | 1.49700 | 81.5 |
| 3 | −178.234 | 0.18 | | |
| 4 | 47.460 | 3.60 | 1.59282 | 68.6 |
| 5 | 161.242 | Variable | | |
| 6* | 330.204 | 0.70 | 1.88300 | 40.8 |
| 7* | 8.348 | 4.65 | | |
| 8 | −36.580 | 0.50 | 1.80400 | 46.6 |
| 9 | 30.455 | 0.20 | | |
| 10 | 17.201 | 2.00 | 1.94595 | 18.0 |
| 11 | 85.968 | Variable | | |
| 12 (Stop) | ∞ | Variable | | |
| 13* | 9.187 | 3.05 | 1.55332 | 71.7 |
| 14* | −71.895 | 1.00 | | |
| 15 | 20.494 | 0.50 | 1.64769 | 33.8 |
| 16 | 10.071 | 0.44 | | |

-continued

Unit: mm

| | | | | |
|---|---|---|---|---|
| 17 | 16.138 | 0.50 | 1.80400 | 46.6 |
| 18 | 7.421 | 2.50 | 1.48749 | 70.2 |
| 19 | −31.010 | 0.30 | | |
| 20 | 221.073 | 0.50 | 1.43875 | 94.9 |
| 21 | 18.106 | 0.50 | | |
| 22 | ∞ | Variable | | |
| 23 | 26.821 | 2.50 | 1.74950 | 35.3 |
| 24 | −22.588 | 0.50 | 1.94595 | 18.0 |
| 25 | −92.531 | Variable | | |
| 26 | ∞ | 0.80 | 1.51633 | 64.1 |
| 27 | ∞ | Variable | | |
| Image plane | ∞ | | | |

Aspheric Coefficients

| | | |
|---|---|---|
| R6 | K = −2.59145e+004 | A4 = 4.48422e−005 |
| | A6 = −2.15171e−007 | A8 = −8.84704e−009 |
| | A10 = 7.40411e−011 | A12 = −8.48395e−014 |
| R7 | K = −1.12770e−002 | A4 = −5.19311e−005 |
| | A6 = 3.48939e−006 | A8 = −7.88437e−008 |
| | A10 = −3.32189e−011 | A12 = −2.84097e−012 |
| R13 | K = −2.75689e−001 | A4 = −3.14532e−005 |
| | A6 = −3.31586e−006 | A8 = −2.80224e−008 |
| | A10 = 2.62605e−010 | |

-continued

Unit: mm

| | | |
|---|---|---|
| R14 | K = 1.27889e+002 | A4 = 1.29193e−004 |
| | A6 = −3.61691e−006 | |

Various Data
Zoom Ratio 44.28

| | Wide-Angle End | Middle Focal Length | Telephoto End |
|---|---|---|---|
| Focal Lengths | 4.30 | 13.08 | 190.43 |
| F-number | 2.87 | 5.00 | 7.07 |
| Angle of View | 37.77 | 16.50 | 1.17 |
| Image Height | 3.33 | 3.88 | 3.88 |
| Lens Total Length | 94.49 | 93.62 | 137.94 |
| BF | 1.00 | 1.00 | 1.00 |
| d5 | 0.78 | 16.63 | 62.36 |
| d11 | 33.89 | 12.70 | 1.31 |
| d12 | 11.05 | 4.86 | −0.50 |
| d22 | 6.65 | 8.59 | 29.47 |
| d25 | 9.55 | 18.28 | 12.72 |
| d27 | 1.00 | 1.00 | 1.00 |

TABLE 1

| Condition | | | 1 | 2 | 3 | 4 | 5 | 6 | 7 |
|---|---|---|---|---|---|---|---|---|---|
| Positive lens G12 | (1) | νd | 68.6 | 68.6 | 81.5 | 68.6 | 68.6 | 81.8 | 81.5 |
| | (2) | θgF | 0.5441 | 0.5441 | 0.5374 | 0.5441 | 0.5441 | 0.5374 | 0.5374 |
| | (3) | | 0.656 | 0.656 | 0.670 | 0.656 | 0.656 | 0.670 | 0.670 |
| Positive lens G13 | (1) | νd | 68.6 | 68.6 | 68.6 | 81.5 | 81.5 | 68.6 | 68.6 |
| | (2) | θgF | 0.5441 | 0.5441 | 0.5441 | 0.5374 | 0.5374 | 0.5441 | 0.5441 |
| | (3) | | 0.656 | 0.656 | 0.656 | 0.670 | 0.670 | 0.656 | 0.656 |
| | (4) | f1/fW | 26.375 | 18.339 | 18.279 | 23.990 | 26.846 | 18.589 | 18.581 |
| | | f1 | 95.247 | 81.061 | 80.797 | 91.183 | 96.849 | 79.982 | 79.914 |
| | | fW | 3.611 | 4.420 | 4.420 | 3.801 | 3.608 | 4.303 | 4.301 |
| | (5) | fG2/fW | 22.801 | 16.136 | 19.179 | 21.008 | 23.340 | 18.728 | 19.388 |
| | (6) | fG3/fW | 38.575 | 27.380 | 25.420 | 38.876 | 43.529 | 27.430 | 26.072 |
| | | fG2 | 82.343 | 71.322 | 84.774 | 79.851 | 84.202 | 80.579 | 83.383 |
| | | fG3 | 139.306 | 121.026 | 112.361 | 147.763 | 157.038 | 118.019 | 112.132 |
| | (7) | nd | 1.5928 | 1.5928 | 1.5449 | 1.5449 | 1.5449 | 1.5449 | 1.5449 |

Now, an exemplary embodiment of a digital camera (an image pickup apparatus) that uses the zoom lens according to each exemplary embodiment of the present invention as a photographic optical system will be described below with reference to FIG. 15.

Referring to FIG. 15, the digital camera includes a digital camera body 20 and a photographic optical system 21, which is constituted by the zoom lens according to any of the above-described exemplary embodiments of the present invention. In addition, the digital camera includes an image sensor 22, such as a CCD sensor or a CMOS sensor. The image sensor 22 receives an object image formed by the photographic optical system 21.

A recording unit 23, such as a FLASH memory, records the object image received by the image sensor 22. A photographer can observe the object image displayed by a display device (not illustrated) via a viewfinder 24. The display device is constituted, for example, by a liquid crystal display (LCD) panel. The display device displays the object image formed on the image sensor 22. The LCD panel has the same function as the function of the viewfinder 24.

By applying the zoom lens according to each exemplary embodiment of the present invention to an image pickup apparatus, such as a digital camera, the present invention can implement an image pickup apparatus having a high optical performance and whose size is small.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-227663 filed Oct. 7, 2010 and No. 2011-184761 filed Aug. 26, 2011, which are hereby incorporated by reference herein in their entirety.

What is claimed is:

1. A zoom lens comprising, in order from an object side to an image side:
   a first lens unit having a positive refractive power;
   a second lens unit having a negative refractive power; and
   a third lens unit having a positive refractive power,
   wherein during zooming, each lens unit is configured to move to cause distances among the lens units to vary,
   wherein the first lens unit consists of one negative lens and two positive lenses, and
   wherein, when θgF is a relative partial dispersion of a material of each positive lens included in the first lens unit and νd is an Abbe number of the material of each positive lens included in the first lens unit, each of the positive lenses included in the first lens unit satisfies the following conditions:

$55.0 < \nu d < 100.0$ $0.52 < \theta gF < 0.59$ $\theta gF + 0.00163 \times \nu d > 0.65.$ 2. The zoom lens according to claim 1, wherein, when fW is a focal length of the entire zoom lens at a wide-angle end and f1 is a focal length of the first lens unit, the following condition is satisfied:

$18.0 < f1/fW < 30.0.$

3. The zoom lens according to claim 1, wherein, when fW is a focal length of the entire zoom lens at the wide-angle end, fG2 is a focal length of a positive lens included in the first lens unit and located closest to the object side, and fG3 is a focal length of a positive lens included in the first lens unit and located closest to the image side, the following conditions are satisfied:

$15.0 < fG2/fW < 25.0$ $24.0 < fG3/fW < 45.0.$

4. The zoom lens according to claim 1, wherein the first lens unit consists of, in order from the object side to the image side:
   a negative lens;
   a first positive lens; and
   a second positive lens.

5. The zoom lens according to claim 1, wherein, when nd is an average refractive index of materials of the positive lenses included in the first lens unit, the following condition is satisfied:

$nd > 1.54.$

6. The zoom lens according to claim 1, wherein, during zooming from a wide-angle end to a telephoto end, the first lens unit moves towards the object side after having moved to the image side so as to be positioned closer to the object side at the telephoto end than at the wide-angle end.

7. The zoom lens according to claim 1, further comprising:
   an aperture stop located between the second lens unit and the third lens unit,
   wherein, during zooming from a wide-angle end to a telephoto end, the aperture stop moves along a locus different from a locus of each lens unit.

8. The zoom lens according to claim 1, further comprising a stop having an aperture diameter,
   wherein, during zooming, the stop moves integrally with the third lens unit while maintaining a constant aperture diameter.

9. The zoom lens according to claim 1, further comprising, on the image side of the third lens unit, a fourth lens unit having a negative refractive power and a fifth lens unit having a positive refractive power.

10. The zoom lens according to claim 9, wherein, during focusing from an infinitely-distant object to a closest-distance object, the fifth lens unit moves towards the object side.

11. The zoom lens according to claim 1, further comprising, on the image side of the third lens unit, a fourth lens unit having a positive refractive power and a fifth lens unit having a positive refractive power.

12. The zoom lens according to claim 11, wherein, during focusing from an infinitely-distant object to a closest-distance object, the fifth lens unit moves towards the object side.

13. The zoom lens according to claim 1, further comprising, on the image side of the third lens unit, a fourth lens unit having a positive refractive power.

14. The zoom lens according to claim 13, wherein, during focusing from an infinitely-distant object to a closest-distance object, the fourth lens unit moves towards the object side.

15. An image pickup apparatus comprising:
   a zoom lens; and
   an image sensor configured to receive an image formed by the zoom lens,
   wherein the zoom lens comprises, in order from an object side to an image side:
      a first lens unit having a positive refractive power;
      a second lens unit having a negative refractive power; and
      a third lens unit having a positive refractive power,
      wherein during zooming, each lens unit is configured to move to cause distances among the lens units to vary,
      wherein the first lens unit consists of one negative lens and two positive lenses, and
      wherein, when θgF is a relative partial dispersion of a material of each positive lens included in the first lens unit and νd is an Abbe number of the material of each positive lens included in the first lens unit, each of the positive lenses included in the first lens unit satisfies the following conditions:

$55.0 < \nu d < 100.0$ $0.52 < \theta gF < 0.59$ $\theta gF + 0.00163 \times \nu d > 0.65.$

* * * * *